(12) United States Patent
Hutabarat et al.

(10) Patent No.: US 10,720,082 B1
(45) Date of Patent: Jul. 21, 2020

(54) DEVICE AND SYSTEM TO TEACH STEM LESSONS USING HANDS-ON LEARNING METHOD

(71) Applicants: Cyrillus Kunta Hutabarat, Broomfield, CO (US); Conny Susan Karman, Broomfield, CO (US)

(72) Inventors: Cyrillus Kunta Hutabarat, Broomfield, CO (US); Conny Susan Karman, Broomfield, CO (US)

(73) Assignee: CTSKH, LLC, Broomfield, CO (US)

( * ) Notice: Subject to any disclaimer, the term of this patent is extended or adjusted under 35 U.S.C. 154(b) by 230 days.

(21) Appl. No.: 15/698,535

(22) Filed: Sep. 7, 2017

Related U.S. Application Data

(60) Provisional application No. 62/385,054, filed on Sep. 8, 2016.

(51) Int. Cl.
| | | |
|---|---|---|
| *G06T 7/00* | (2017.01) | |
| *G09B 23/00* | (2006.01) | |
| *G09B 5/02* | (2006.01) | |
| *G09B 23/02* | (2006.01) | |
| *G09B 19/02* | (2006.01) | |
| *G09B 19/00* | (2006.01) | |

(52) U.S. Cl.
CPC .............. *G09B 23/00* (2013.01); *G09B 5/02* (2013.01); *G09B 19/0069* (2013.01); *G09B 19/025* (2013.01); *G09B 23/02* (2013.01)

(58) Field of Classification Search
None
See application file for complete search history.

(56) References Cited

U.S. PATENT DOCUMENTS

| | | |
|---|---|---|
| 7,295,220 B2 | 11/2007 | Zhou et al. |
| 7,339,572 B2 | 3/2008 | Schena |
| 7,576,725 B2 | 8/2009 | Bathiche et al. |
| | (Continued) | |

FOREIGN PATENT DOCUMENTS

| | | |
|---|---|---|
| WO | 2009/134563 A2 | 11/2009 |
| WO | 2012/038875 A2 | 3/2012 |
| WO | 2012/145542 A1 | 10/2012 |

OTHER PUBLICATIONS

Billinghurst, Mark, Hirokazu Kato, and Ivan Poupyrev. "Tangible augmented reality." ACM SIGGRAPH Asia 7 (Dec. 2008).
(Continued)

*Primary Examiner* — Sunit Pandya

(57) ABSTRACT

A method includes capturing, by a camera coupled to a computing device, a video of an experimental platform device having a designated area for an experiment and displaying, by the computing device, the video of the experimental platform device. The method further includes superimposing, in the video, an overlay animation on the designated area of the experimental platform device, the overlay animation corresponding to an environment of the experiment. The method further includes receiving, by the computing device from the experimental platform device, independent variable data corresponding to manipulations of a sensor of the experimental platform device by a user. The method further includes modifying, in the video, the overlay animation superimposed on the designated area based on the independent variable data.

20 Claims, 29 Drawing Sheets

(56) References Cited

U.S. PATENT DOCUMENTS

| | | | | |
|---|---|---|---|---|
| 7,843,429 B2* | 11/2010 | Pryor | ................. | G06F 3/042 |
| | | | | 345/158 |
| 7,991,220 B2* | 8/2011 | Nagai | ................. | A63F 3/00643 |
| | | | | 345/633 |
| 8,042,949 B2* | 10/2011 | Taylor | ................. | G06F 3/0421 |
| | | | | 345/173 |
| 8,064,684 B2 | 11/2011 | Ratti et al. | | |
| 8,089,456 B2 | 1/2012 | Grego et al. | | |
| 8,466,873 B2 | 6/2013 | Vertegaal et al. | | |
| 8,754,886 B2 | 6/2014 | Wouhaybi et al. | | |
| 8,803,810 B2 | 8/2014 | Yang | | |
| 8,823,697 B2 | 9/2014 | Woo et al. | | |
| 8,933,875 B2 | 1/2015 | Moussavi | | |
| 9,004,922 B2 | 4/2015 | Eggert et al. | | |
| 9,014,614 B2 | 4/2015 | Roots et al. | | |
| 9,072,973 B2* | 7/2015 | Elliott | ................. | A63H 30/00 |
| 9,076,344 B1 | 7/2015 | Higgins et al. | | |
| 9,108,114 B2 | 8/2015 | Goh et al. | | |
| 9,158,389 B1* | 10/2015 | Sharma | ................. | H04N 5/2252 |
| 9,245,193 B2* | 1/2016 | Kulkarni | ................. | G06K 9/00671 |
| 9,324,241 B2 | 4/2016 | Roots et al. | | |
| 9,349,218 B2 | 5/2016 | Keating et al. | | |
| 9,354,716 B1 | 5/2016 | Sharma et al. | | |
| 9,361,730 B2 | 6/2016 | Keating et al. | | |
| 9,808,706 B2* | 11/2017 | Jaqua | ................. | A63F 3/00214 |
| 10,089,772 B2* | 10/2018 | Taylor | ................. | G06T 13/40 |
| 2006/0026361 A1 | 2/2006 | Shimizuno et al. | | |
| 2007/0247422 A1 | 10/2007 | Vertegaal et al. | | |
| 2008/0100620 A1* | 5/2008 | Nagai | ................. | A63F 3/00643 |
| | | | | 345/424 |
| 2009/0184921 A1 | 7/2009 | Scott et al. | | |
| 2009/0273560 A1 | 11/2009 | Kalanithi et al. | | |
| 2010/0005413 A1 | 1/2010 | Liang et al. | | |
| 2010/0045705 A1 | 2/2010 | Vertegaal et al. | | |
| 2010/0060570 A1 | 3/2010 | Underkoffler et al. | | |
| 2010/0279258 A1 | 11/2010 | Cohen | | |
| 2011/0215998 A1 | 9/2011 | Fitzgerald et al. | | |
| 2012/0016384 A1 | 1/2012 | Wilke et al. | | |
| 2012/0112994 A1 | 5/2012 | Vertegaal et al. | | |
| 2012/0122059 A1 | 5/2012 | Schweikardt et al. | | |
| 2012/0162214 A1 | 6/2012 | Chavez et al. | | |
| 2012/0270497 A1 | 10/2012 | Merrill et al. | | |
| 2012/0280902 A1 | 11/2012 | Persaud et al. | | |
| 2013/0249947 A1 | 9/2013 | Reitan | | |
| 2014/0213140 A1 | 7/2014 | Goh et al. | | |
| 2014/0344762 A1 | 11/2014 | Grasset et al. | | |
| 2015/0169173 A1 | 6/2015 | Chavez et al. | | |
| 2015/0301643 A1 | 10/2015 | Hafidh et al. | | |
| 2015/0339532 A1* | 11/2015 | Sharma | ................. | A63F 13/213 |
| | | | | 345/633 |
| 2016/0026361 A1 | 1/2016 | Chavez et al. | | |
| 2016/0026362 A1 | 1/2016 | Chavez et al. | | |
| 2016/0049095 A1 | 2/2016 | Yannier et al. | | |

OTHER PUBLICATIONS

Chen, Rui, and Xiangyu Wang. "An empirical study on tangible augmented reality learning space for design skill transfer." Tsinghua Science & Technology 13 (Oct. 2008): 13-18.

Juan C., "Augmented Reality Interactive Storytelling Systems Using Tangible Cubes for Edutainment," In Proceedings of the 2008 Eighth IEEE International Conference on Advanced Learning Technologies (ICALT), IEEE Computer Society, Washington, DC, USA, 2008, pp. 233-235, http://dx.doi.org/10.1109/ICALT.2008.122.

Lee, G.A. et al., "Occlusion based Interaction Methods for Tangible Augmented Reality Environments," Proceedings of the 2004 ACM SIGGRAPH International Conference on Virtual Reality Continuum and Its Applications in Industry (VRCAI '04), Jan. 1, 2004, pp. 419-426, XP55005457, 1 New York, New York, USA DOI: 10.1145/1044588.1044680. ISBN: 978-1-58-0113884-9.

Sinclair P., et al., "Adapting Information Through Tangible Augmented Reality Interfaces," In UbiComp 2004, the Sixth International Conference on Ubiquitous Computing, Sep. 2004, 2 Pages, URL: http://citeseerx.ist.psu.edu/viewdoc/download?doi=10.1.1.96.3820&rep=rep1-&type=pdf.

Slay H., et al., "Tangible user interaction using augmented reality," Australian Computer Science Communications, vol. 24 (4), Jan. 2002, pp. 13-20, http://dx.doi.org/10.1145/563997.563988.

Yan Q., "Tangible User Interfaces for Augmented Reality," National University of Singapore, 2003, 144 Pages, URL https://scholarbank.nus.edu.sg/bitstream/handle/10635/14133/ThesisV2.pdf?-sequence=1.

Fjeld et al., "Chemistry Education: A Tangible Interaction Approach," Proceedings of INTERACT2003, Sep. 1-5, 2003, Zurich, Switzerland (8 pgs).

* cited by examiner

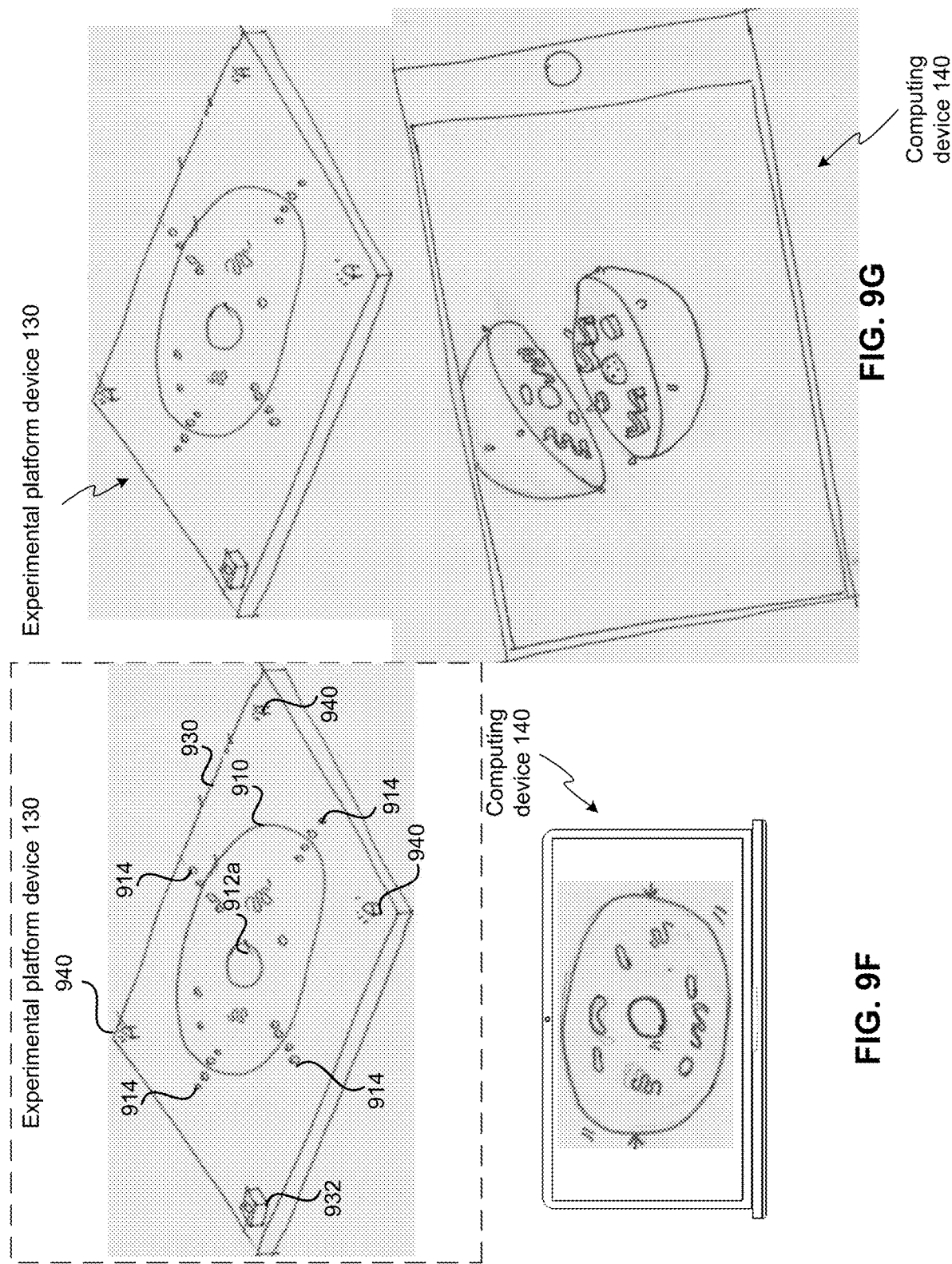

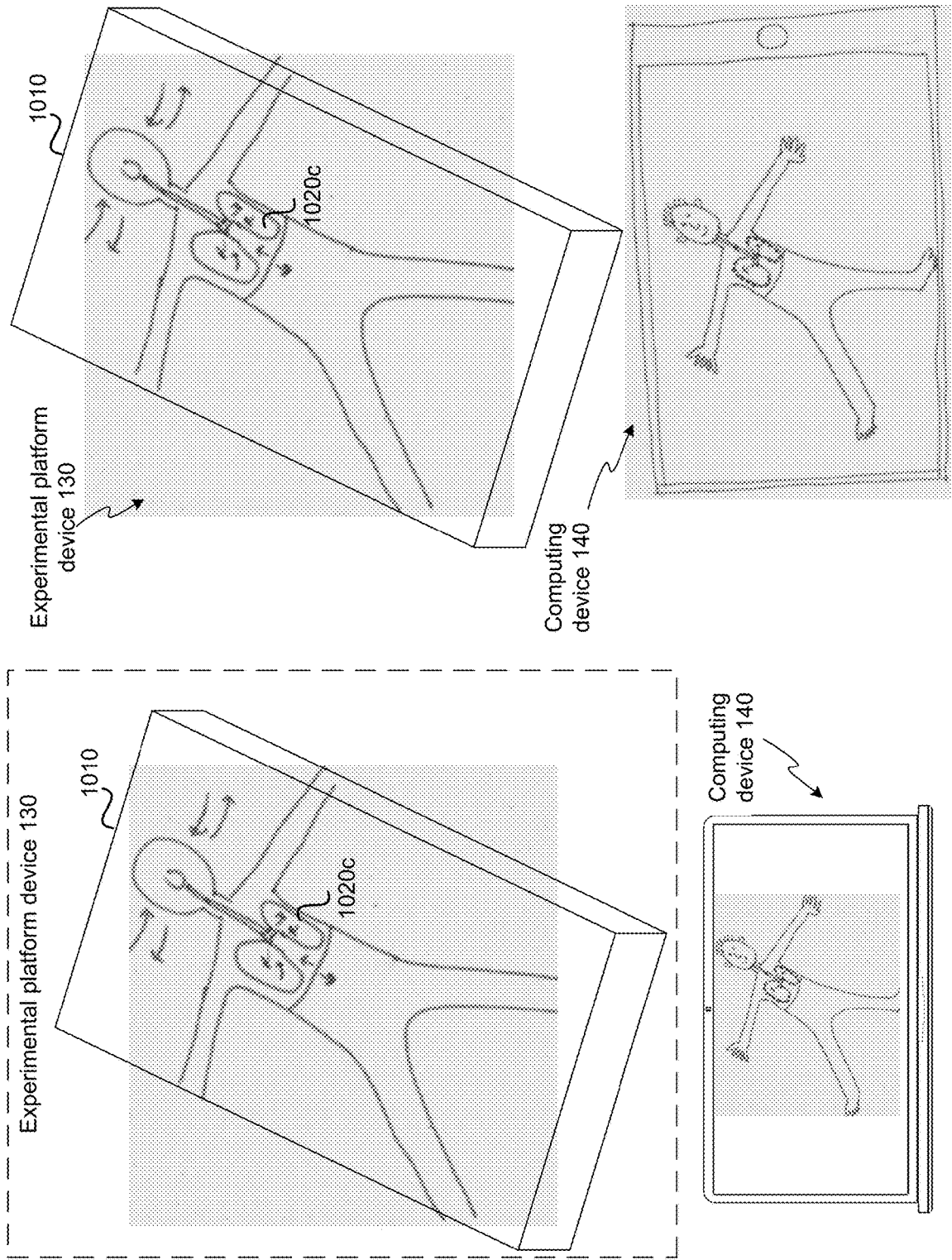

US 10,720,082 B1

DEVICE AND SYSTEM TO TEACH STEM LESSONS USING HANDS-ON LEARNING METHOD

PRIORITY CLAIM

This application claims priority to U.S. Provisional Application No. 62/385,054 filed on Sep. 8, 2016, the entire contents are hereby incorporated by reference.

BACKGROUND

Kids and students learn best when they are using their hands and actively playing as they learn. This leads to the idea of using hands-on method to teach lessons. Unfortunately there are limited teaching materials that can be brought into the classroom to support teaching using hands-on method. For example, it would be almost practically impossible to teach "soundwave travel in vacuum" and by bringing a vacuum space environment into the classroom. On the other hand, many of the teaching materials available today are delivered through computers, whether it is through reading of eBook, video, or applications run on computers. These types of tools unfortunately missed the hands-on and experiential learning which has proven to be a better way for students' learning.

BRIEF SUMMARY

In implementations, hardware and software may be used to represent scientific phenomena and to allow the teaching of science and other subjects in the classroom. In some implementations, the subjects are science technology engineering and mathematics (STEM) subjects. In some implementations, the subjects are non-STEM subjects. Students may manipulate physical objects (e.g., an experimental platform device) and experience the effect of the manipulation (e.g., via a display of a computing device, via the physical objects, etc.). The physical objects may be different shapes and forms and may be coupled with sensors and communication devices such that the information of the manipulation may be communicated and processed by the computing device. The computing device may transform the manipulation to activities applicable to subjects being taught. A computing device may include desktop, laptop, tablet, smartphone, chromebook, netbook, etc. The computing device may be a microprocessor-driven machine with ability to provide a display and communicate with other devices (e.g., via wireless communication).

By using an experimental platform device, the students may have the experience of doing hands-on activities while learning their lessons. The computer and software may provide flexibility of delivering different type of subjects. The features and advantages described in this disclosure and in the following detailed description are not all-inclusive. For example, the disclosure may be used in a regular school and classroom environment, in an industrial training environment, in a hospital training environment, in a higher education environment, etc.

One or more experiments (e.g., lessons) may be associated with the devices disclosed herein. The one or more experiments may be difficult for students to grasp, or difficult for teachers to teach, and hence the learning experience of the subjects can be greatly enhanced using the hands-on experiments disclosed herein. In general, many lessons on scientific and natural phenomena may be associated with the devices disclosed herein.

Throughout this disclosure several terms may be used interchangeably. The term 'users' may be used for the users of the system (e.g., the hardware or the software). In some implementations, the 'users' are the students. In some implementations, the 'users' of the software will be the instructors. The term 'educators,' 'teachers,' etc. may be used instead of 'instructors' to denote users of the devices disclosed herein, which includes parents of homeschooled children, trainers in industrial environment, instructors in higher learning institution, etc. In one implementation, the physical object (e.g., the experimental platform device) is a substantially rectangular shape with a substantially flat surface, and multiple terms are used to denote the physical object such as surface table or stream table. The software application that users use with the device may be referred to as a 'lesson,' as the devices may be used in conjunction with teaching of a subject.

Although the disclosure has been described and illustrated with a certain degree of particularity, it is understood that the present disclosure has been made only by way of examples. Many changes in the combination and arrangement of parts can be resorted to by those skilled in the art without departing from the idea and the spirit of the disclosure.

BRIEF DESCRIPTION OF THE DRAWINGS

FIGS. 9A-G illustrate a system for modifying an overlay animation for a cell experiment, in accordance with implementations of the disclosure.

FIGS. 10A-D illustrate a system for modifying an overlay animation for an anatomy experiment, in accordance with implementations of the disclosure.

DETAILED DESCRIPTION

In implementations, an experimental platform device may provide educators with an ability to teach different subjects at school using hands-on experiments. The disclosure applies technology and methodology to allow physical objects (e.g., the experimental platform device, etc.) to communicate (e.g., wirelessly) with a computing device. The computing device may identify activities (e.g., interaction of a user with the physical objects) and may modify an animation displayed via the computing device in response to the activities. The activities may be identified by one or more sensors coupled to the physical objects. The one or more sensors allow one or more actions to be performed by the user in relation to the experimental platform device. The one or more actions may mimic a natural way of how a user may interact in real life, such as turning, tapping, or shaking. Through these implementations, the user may experience activities as if the user was performing an experiment with a real scientific phenomenon, even though the user is operating a simulated environment.

Examples of the physical objects may include, but are not limited to: blocks, cylinders, cubes, spheres, tiles, hexagons, flat surface or more complex shapes and objects. Examples of sensors include, but are not limited to acceleration/tilt sensors, capacitive touch sensors, potentiometers, clickable buttons, gyroscopic sensors, color sensors, motion sensors, light or image sensors, magnetic field sensors, or any other element that may be triggered or affected by human physical activity, chemical or electrical interaction. Upon receiving an indication of an interaction of a user with a physical object, the computing device may display a response (e.g., via the computing device, via a display device coupled to the computing device) or may provide a response via one or more physical objects (e.g., cause the experimental platform device to provide feedback).

The physical objects disclosed herein may include electronic devices (e.g., experimental platform device, etc.) with ability to sense a user's action and ability to communicate (e.g., wirelessly) with the computing device.

Figure 1A:
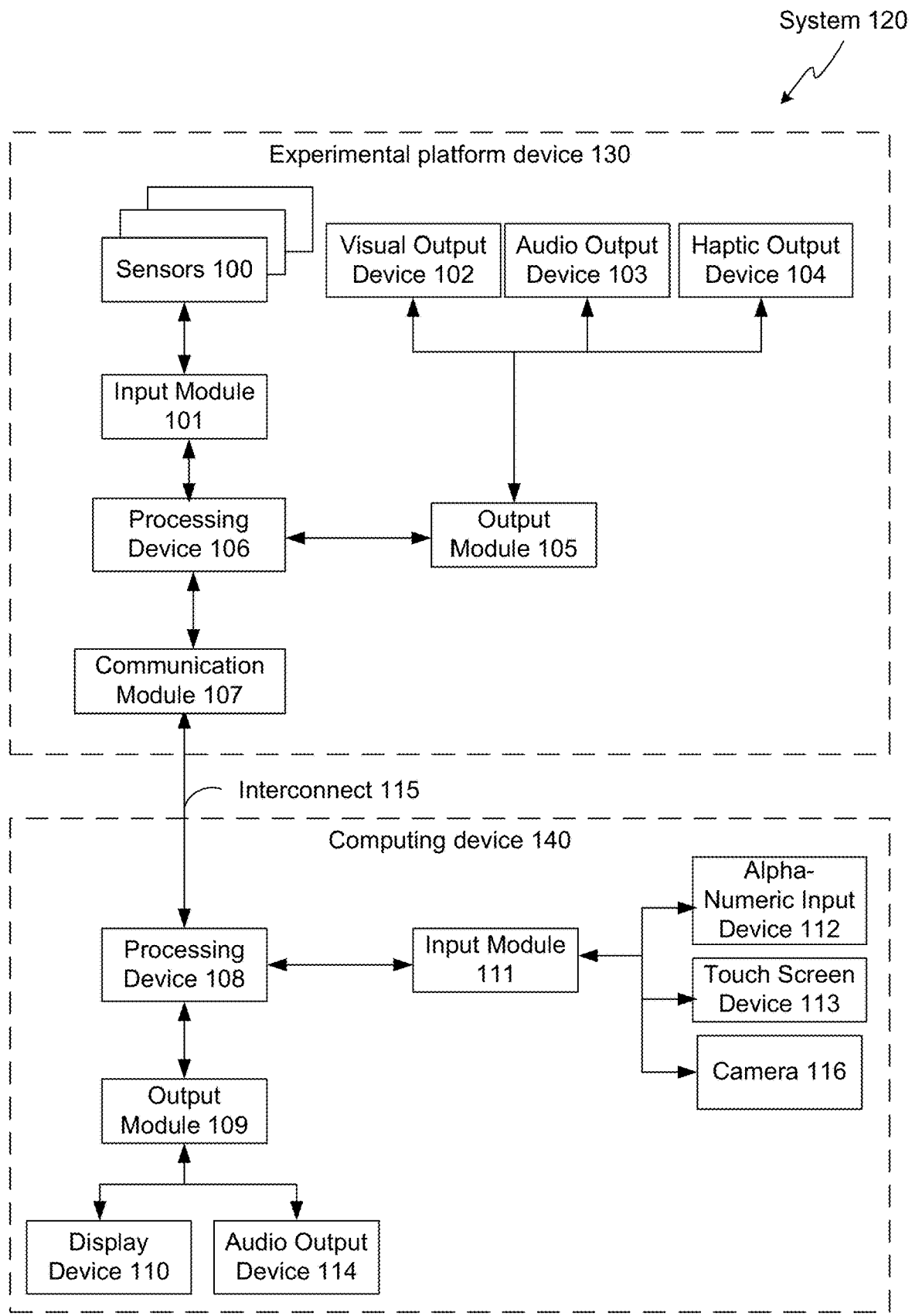
FIG. 1A is a block diagram illustrating an exemplary system architecture, in accordance with an implementation of the disclosure.

FIG. 1A is a block diagram illustrating an exemplary system architecture, in accordance with an implementation of the disclosure. A system 120 may include an experimental platform device 130 and a computing device 140. The experimental platform device 130 may include one or more sensors 100, an input module 101, a visual output device 102 (e.g., a light, a light emitting diode (LED), a display device, etc.), an audio output device 103 (e.g., a speaker), a haptic output device 104 (e.g., a vibrator), an output module 105, a processing device 106 (e.g., a microcontroller), a communication module 107, etc. The visual output device (e.g., LED) may signal whether the experimental platform device 130 is currently coupled with a computing device 140 (e.g., not available to other users) or not coupled to a computing device 140. In one implementation, the communication module 107 may communicate via a wireless network (e.g., Wi-Fi technology), a personal area network (PAN) (Bluetooth), etc. The processing device 106 may have Over-The-Air (OTA) firmware update ability via communication module 107. The experimental platform device 130 may include an on/off power button and a power supply (e.g., a battery). The experimental platform device 130 may include a flat surface. The flat surface may be a three-dimensional object (e.g., a rectangular prism) that includes one or more of sensors 100, an input module 101, a visual output device 102, an audio output device 103, a haptic output device 104, an output module 105, a processing device 106, a communication module 107, etc. The experimental platform device 130 may include one or more devices that are external to the flat surface and that include one or more of sensors 100, an input module 101, a visual output device 102, an audio output device 103, a haptic output device 104, an output module 105, a processing device 106, a communication module 107, etc.

The computing device 140 may include a processing device 108, an output module 109, a display device 110, an input module 111, an alpha-numeric input device 112 (e.g., a keyboard), a touch screen device 113, an audio output device 114 (e.g., a speaker), a camera 116, etc. The experimental platform device may be coupled to the computing device 140 via an interconnect 115.

In one implementation, interconnect 115 includes a network, where the experimental platform device is coupled to the computing device via the network. The network may be a public network that provides the computing device 140 with access to the experimental platform device 130. Interconnect 115 may include one or more wide area networks (WANs), local area networks (LANs), wired networks (e.g., Ethernet network), wireless networks (e.g., an 802.11 network or a Wi-Fi network, a network using Bluetooth® technology), cellular networks (e.g., a Long Term Evolution (LTE) network), routers, hubs, switches, servers, computers, and/or combination thereof. In another implementation, the experimental platform device 130 and computing device 140 communicate with each other via the interconnect 115 without accessing a network.

A user may interact with the experimental platform device 130 and one or more sensors 100 may detect the interaction. Information about the interaction (e.g., as received by the one or more sensors 100) may be processed by processing device 106 and transmitted, by the communication module 107, to the computing device 140 via interconnect 115. Communication between experimental platform device 130 and computing device 140 via interconnect 115 may include Wi-Fi®, WiMax™, Bluetooth®, Zigbee®, Z-Wave®, Cellular or other methods of wireless communication. The computing device 140 may be a desktop computer, a laptop computer, a tablet, or a Chromebook. The computing device 140 may have an operating system, such as iOS, Android, Windows, Linux, ChromeOS, etc. The computing device 140 may process and respond to interaction by the user with the experimental platform device 130 by displaying information via the display device 110. The computing device 140 may transmit information through interconnect 115 to the processing device 106 (e.g., microprocessor) of the experimental platform device 130. The processing device 106 may transmit the information to output module 105 which may provide feedback to the user, such as through visual output device 102 (e.g., LED light), audio output device 103 (e.g., speaker) or haptic output device 104 (e.g., vibrator, tactile device, etc.). The computing device may have an output module 109 that may provide output to the user, for example visually through display device 110 or audibly through audio output device 114. The computing device 140 may have an input module 111 that receives input through alpha-numeric input device 112, touch screen device 113, camera 116, etc.

In some implementations, the experimental platform device 130 includes a rectangular board platform (e.g., 204 in FIGS. 2A-B, 301 in FIGS. 2A-B, 702 in FIGS. 7A-C, 810 in FIGS. 8A-D, 910 and 930 in FIGS. 9F-G, 1010 in FIGS. 10A-D, 1110 in FIGS. 11A-B, 1210 in FIGS. 12A-B, 1310 in FIGS. 13A-B, 1410 in FIGS. 14A-B, 1510 in FIGS. 15A-B, 1610 in FIGS. 16A-B, 1710 in FIGS. 17A-B, etc.) that includes sensors. The experimental platform device 130 may also include additional objects (e.g., cubes) that may include touch sensors and LEDs. The computing device 140 may detect the additional objects and may superimpose an overlay animation (e.g., human organ, plant, car, collection of factories, rainforest, etc.) on the additional object. The additional object may be a cube or a three-dimensional shape (e.g., representing a human organ, a cell organelle, a brain sections, a car, a factory, a rain forest, etc.). The three-dimensional shape may be flat on the top and curvy on the sides (e.g., like a thick jigsaw puzzle piece). In response to user input via the touch sensor of an additional object, the quantity or type of graphical representation displayed via the computing device 140 may change. The rectangular board platform may include a start button to trigger the start of simulation on the computing device 140 (e.g., starting the simulation on an application executing on the computing device 140). The rectangular board platform may include an on/off button, a power source (e.g., battery, future power storage).

Figure 1B:
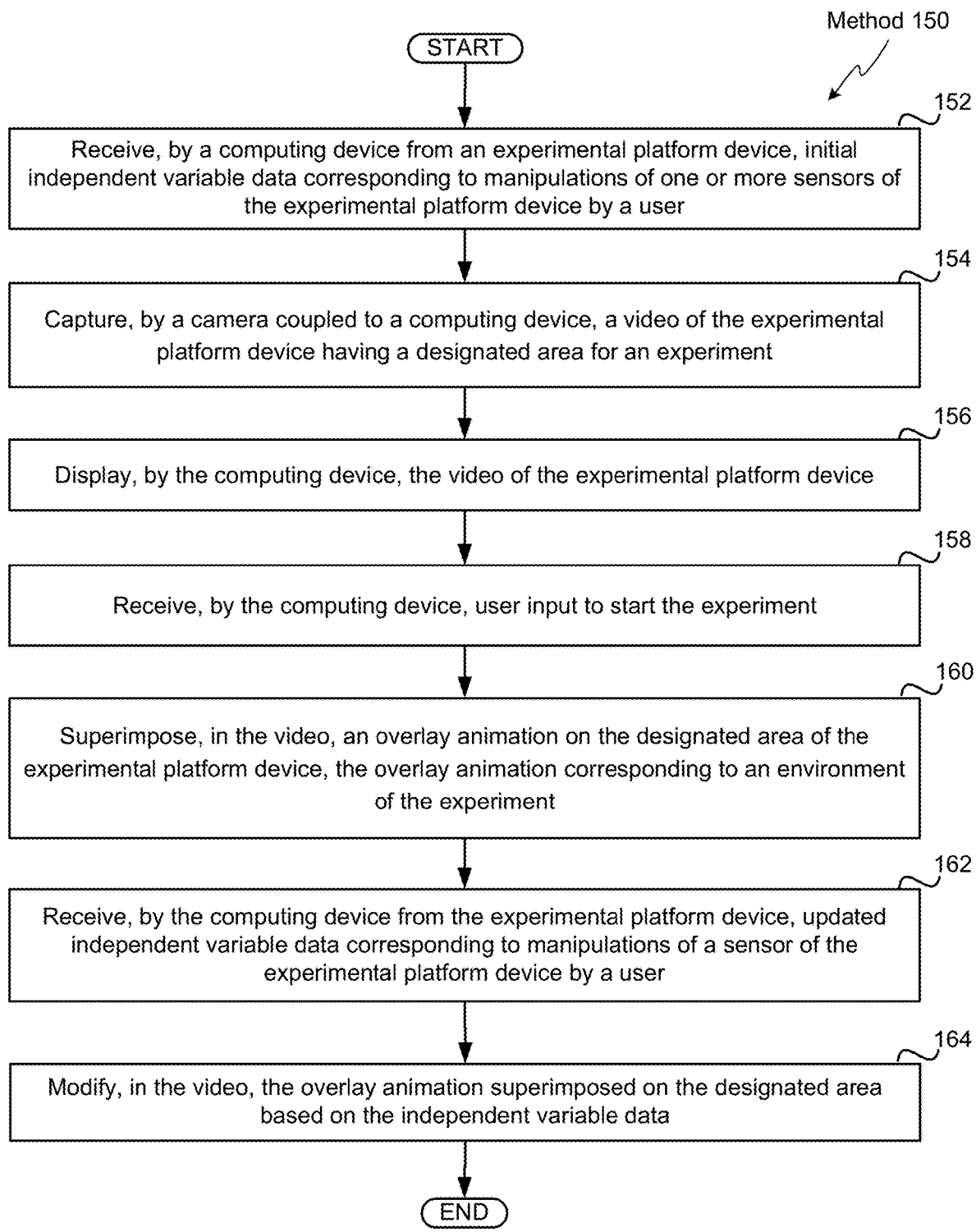
FIG. 1B is a flow diagram illustrating an example method for modifying an overlay animation, in accordance with an implementation of the disclosure.
Figure 4:
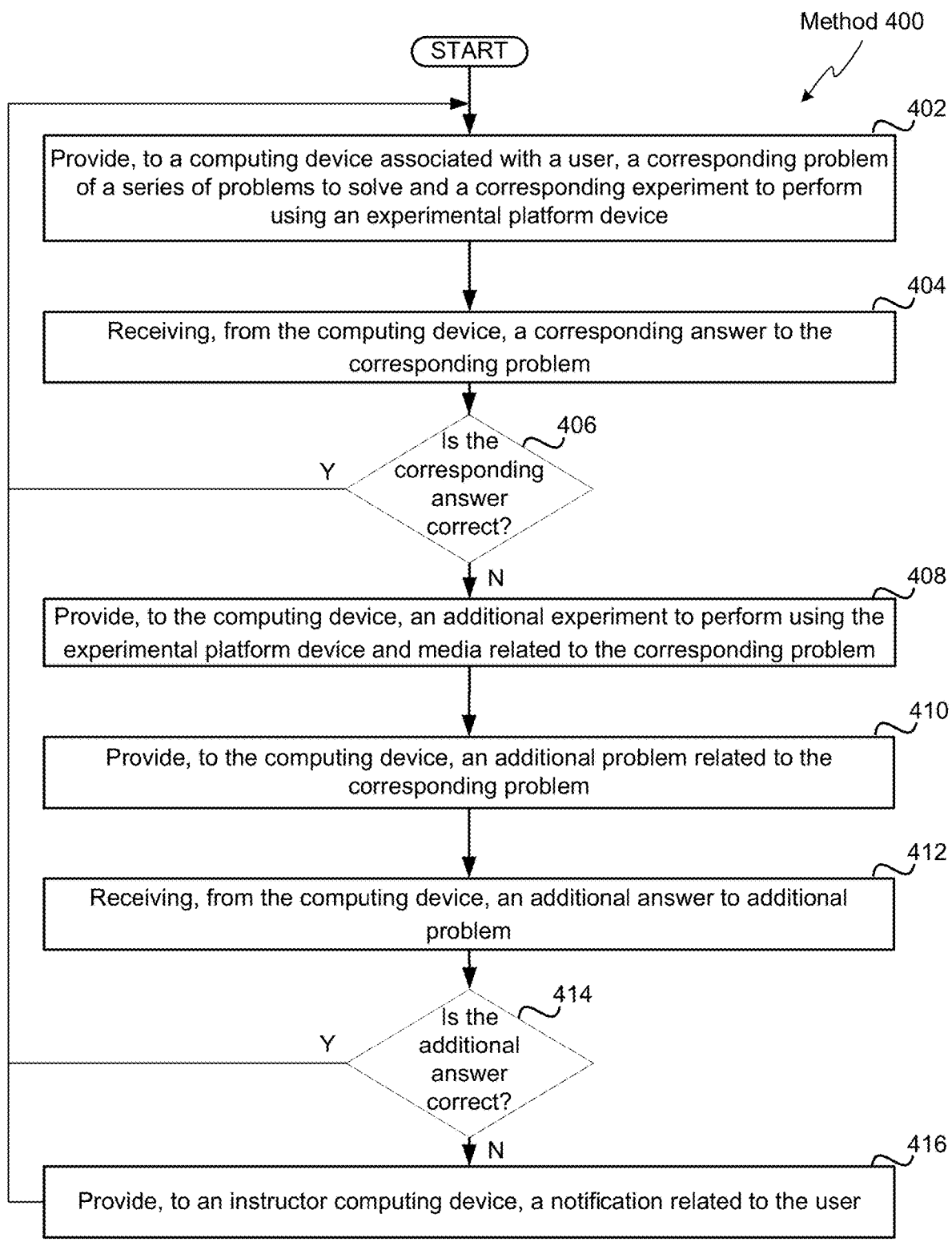
FIG. 4 is a flow diagram illustrating an example method for modifying an overlay animation for use of an experimental platform device in the classroom, in accordance with another implementation of the disclosure.

FIGS. 1B and 4 are flow diagrams illustrating example methods 150 and 400 for modifying an overlay animation, in accordance with an implementation of the disclosure. Method 150 is an example method from the perspective of the computing device 140. Method 400 is an example method from the perspective of a server device. Methods 150 and 400 may be performed by processing devices that may include hardware (e.g., circuitry, dedicated logic), software (such as is run on a general purpose computer system or a dedicated machine), or a combination of both. Methods 150 and 400 and each of their individual functions, routines, subroutines, or operations may be performed by one or more processors of a computer device executing the method. In certain implementations, methods 150 and 400 may be performed by a single processing thread. Alternatively, methods 150 and 400 may be performed by two or more processing threads, each thread executing one or more individual functions, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory computer readable storage medium may store instructions, which when executed, cause a processing device (e.g., of a computing device 140, of a server device, etc.) to perform operations including methods disclosed within. In one implementation, method 150 may be performed by computing device 140 of FIG. 1. In another implementation, method 400 may be performed by a server device that is coupled to a computing device 140 associated with a user and that is coupled to an instructor computing device.

Referring to FIG. 1B, method 150 may be performed by one or more processing devices of computing device 140 for modifying an overlay animation for an experiment. For example, method 150 may be performed by software executing on the one or more processing devices. The experiment may be one or more of an erosion experiment (e.g., FIGS. 2A-B), a beach erosion experiment (e.g., FIGS. 3A-B), a soundwave experiment (e.g., FIGS. 7A-C), an astronomy experiment (e.g., FIGS. 8A-G), a cell experiment (e.g., FIGS. 9A-G), an anatomy experiment (e.g., FIGS. 10A-D), a weather experiment (e.g., FIGS. 11A-B), a matter experiment (e.g., FIGS. 12A-B), a force and motion experiment (e.g., FIGS. 13A-B), a potential and kinetic energy experiment (e.g., FIGS. 14A-B), a brain experiment (e.g., FIGS. 15A-B), a photosynthesis and respiration experiment (e.g., FIGS. 16A-B), a climate change experiment (e.g., FIGS. 17A-B), or some other experiments.

Method 150 may begin at block 152 where the processing device may receive, from an experimental platform device 130, initial independent variable data (e.g., sensor data) corresponding to manipulations of one or more sensors 100 of the experimental platform device 130 by a user. In one implementation, the experimental platform device 130 may have default initial independent variable data. In one implementation, a user may set up the experiment by defining the independent variable data. In one implementation, computing device 140 may receive user input indicating the independent variable data via a GUI displayed on the computing device 140. In one implementation, computing device 140 may receive user input indicating the independent variable data (e.g., sensor data) via the experimental platform device 130.

At block 154, the processing device may capture, via a camera 116 coupled to the processing device, a video of the experimental platform device 130 having a designated area for the experiment. The processing device may be part of a computing device 140 and the camera 116 may be coupled to the computing device 140. In one implementation, the camera 116 is integral to the computing device 140. For example, the computing device may be a mobile device (e.g., a smartphone, a tablet, a laptop, etc.) and the camera 116 is integral to the mobile device. In another implementation, the camera 116 is external to the computing device 140. For example, the camera 116 (e.g., a webcam, a wireless camera, etc.) may be coupled to the computing device 140 via a network or via an interconnect (e.g., a USB cable).

The designated area may be at least a portion of a surface (e.g., an upper surface, a flat surface, a flat upper surface) of the experimental platform device 130. The user may direct the camera 116 towards the experimental platform device 130 (e.g., orient the computing device 140 with a rear-facing camera to display the experimental platform device 130 via the display device 110 of the computing device 140) prior to starting the experiment.

At block 156, the processing device may display (e.g., via display device 110) the video of the experimental platform device 130 (e.g., prior to initiating the experiment). In one implementation, the video includes the designated area. In another implementation, the video includes the experimental platform device 130. In another implementation, the video includes the experimental platform device and a surrounding area. In one implementation, the processing device displays the independent variable data (e.g., sensor data) as it is selected by the user.

The processing device may display the video via a display device 110. The processing device may provide a visual portion of the video via display device 110 and an audio portion of the video via audio output device 114. In one implementation, one or more of display device 110 or audio output device 114 is integral to the computing device 140. For example, the computing device may be a mobile device (e.g., a smartphone, a tablet, a laptop, etc.) and one or more of display device 110 or audio output device 114 is integral to the mobile device. In another implementation, one or more of display device 110 or audio output device 114 is external to the computing device 140. For example, one or more of display device 110 or audio output device 114 (e.g., a monitor, a television set, a speaker, etc.) may be coupled to the computing device 140 via a network.

At block 158, the processing device may receive user input to start an experiment. In one implementation, once the independent variables of the experiment are set, the user may start the experiment by interacting with a sensor 100 (e.g., the experiment initiation component 203) of the experimental platform device 130. In another implementation, the computing device 140 may display a GUI element (e.g., a start button) and the user may start the experiment by interacting the GUI element (e.g., pressing the start button).

At block 160, the processing device may superimpose, in the video, an overlay animation 230 on the designated area of the experimental platform device 130. The overlay animation 230 may correspond to an environment of the experiment and the initial independent variable data. The experimental platform device 130 and surrounding area may be visible in the video with the superimposed overlay animation (e.g., the overlay animation may be superimposed on the designated area and not over the entire video).

In one implementation, the processing device may determine the type of animation corresponding to an environment of the experiment based on user input received via the input module 111 from one or more of an alpha-numeric input device 112, a touch screen device 113, a cursor control device, etc. For example, a user may select an experiment (e.g., erosion experiment, beach erosion experiment, sound-wave experiment, sonar experiment, astronomy experiment, cell experiment, anatomy experiment, weather experiment, matter experiment, force and friction experiment, potential and kinetic energy experiment, brain experiment, photosynthesis and respiration experiment, climate change experiment, etc.) via an input device (e.g., alpha-numeric input device 112, touch screen device 113, cursor device, etc.). In another example, the processing device may determine the type of animation corresponding to an environment of the experiment based on image data captured via the camera 116. For example, the processing device may capture image data of an experimental platform device 130 and select an experiment based on the image data of the experimental platform device 130.

In one implementation, the processing device may determine the type of animation based on information received from the experimental platform device 130. For example, the experimental platform device 130 may transmit a signal to computing device 140 and the processing device may determine the type of animation corresponding to an environment of the experiment based on the signal. In one implementation, the experimental platform device 130 corresponds to one type of experiment. In another implantation, the experimental platform device 130 corresponds to multiple types of experiments. The sensors 100 may detect user input of a selection of a type of experiment via the experimental platform device 130.

At block 162, the processing device may receive, from the experimental platform device 130, independent variable data (e.g., sensor data) corresponding to manipulations of a sensor 100 of the experimental platform device 130 by a user. The manipulations of the sensor 100 may include user input including one or more updated independent variable values (e.g., modifications of one or more of the initial independent variable values). The manipulations of the sensor 100 may be received after the computing device 140 has displayed at least a portion of the video including the superimposed overlay animation based on the initial independent variable data. In one implementation, the sensor 100 may be one or more of a gyroscope, an accelerometer, or a touch capacitance sensor. In another implementation, the sensor 100 is a switch and the independent variable data (e.g., sensor data) is a state of the switch.

In one implementation, the experimental platform device 130 may include a first object and a second object external to the first object. The first surface of the first object may include the designated area for the experiment and the sensor 100 may be integral to the second object. In one implementation, manipulations of a sensor 100 integral to the second object are transmitted by the second object to the computing device 140. In another implementation, manipulations of the sensor 100 integral to the second object are transmitted by the second object to the first object and the first object transmits the manipulations to the computing device 140.

In one implementation, the manipulations of the sensor 100 of the experimental platform device 130 by the user include manipulations of the sensor 100 of the experimental platform device 130 by an object manipulated by the user. For example, placement of a physical object, by a user, on the experimental platform device 130 may cause manipulations of the sensor 100. In another implementation, the sensor 100 of the experimental platform device 130 may be an actuator that is integrated with the experimental platform device 130 (e.g., the sensor 100 may be integral to the experimental platform device 130).

At block 164, the processing device may modify, in the video, the overlay animation superimposed on the designated area based on the independent variable data. In one implementation, the overlay animation may be modified at substantially the same time (e.g., modified in real-time) as the experimental platform device 130 receives user input (e.g., detects manipulations of a sensor 100 of the experimental platform device 130). For example, a user may toggle a switch on the experimental platform device 130 and the processing device may modify the overlay animation at substantially the same time as the switch is toggled.

Figure 2A:
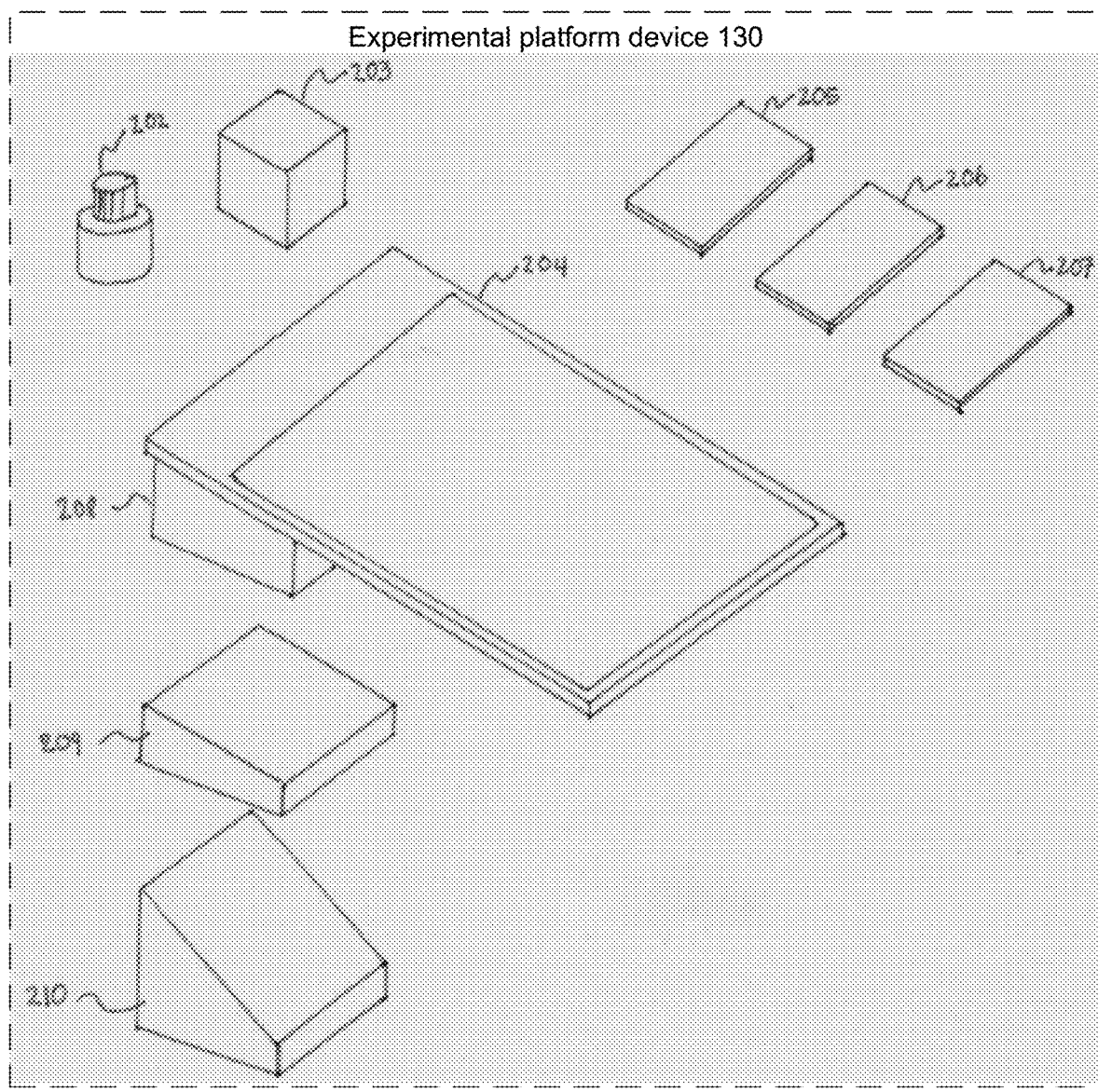
FIG. 2A illustrates a system for modifying an overlay animation for an erosion experiment, in accordance with an implementation of the disclosure.
Figure 2A:
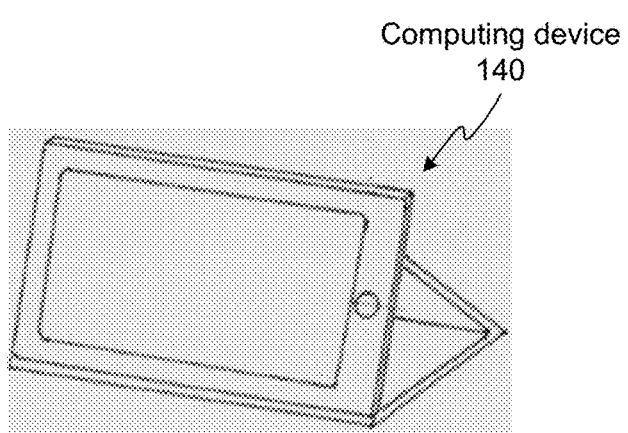

FIG. 2A illustrates a system for modifying an overlay animation for an erosion experiment (e.g., a lesson in Erosion), in accordance with an implementation of the disclosure. The experimental platform device 130 may be a representation of a Stream Table (e.g., liquid stream table, water stream table). A real stream table is typically used in teaching erosion, where the students fill the stream table with sand, and then pour water onto the sand and see the impact of the water erosion. As shown in FIG. 2A, the real stream table is replaced by the experimental platform device 130 (e.g., an electronic stream table) that has a rectangular flat surface table 204 (e.g., including the designated area for the experiment) and that is equipped with sensor 100 (e.g., a gyroscope sensor) that will be able to identify the inclination of the experimental platform device 130 (e.g., the angle of the rectangular flat surface table 204).

The experimental platform device 130 (e.g., each physical object of the experimental platform device 130) may include one or more of a processing device 106 (e.g., microcontroller), a communication module 107 (e.g., with Bluetooth® and OTA ability), a visual output device 102 (e.g., LED), an audio output device 103 (e.g., speaker), a haptic output device 104 (e.g., a vibrator), a battery, a switch to turn on the experimental platform device 130, and one or more sensors 100. The sensors 100 may include one or more of a gyroscope sensor, a touch sensor, a push button switch, a rotary potentiometer, or a color sensor. The one or more sensors 100 may be used by the user to set up the experiment and to modify the experiment. The experimental platform device 130 may include an LED, a speaker, a haptic device, a switch to turn on the flat surface table 204, a power source (e.g., battery), etc.

The experimental platform device 130 may include a selection component 202 (e.g., a rotary potentiometer, a push button switch, a touch sensor), an experiment initiation component 203 (e.g., a touch sensor, a capacitive touch sensor), a flat surface table 204, substrate components 205-207, wedges 208-210, a substrate determining component (e.g., a color sensor, a radio-frequency identification (RFID) sensor, etc.). In one implementation, selection component 202, experiment initiation component 203, and substrate determining component are integral to the flat surface table 204. In another implementation, experimental platform device 130 includes two or more physical objects external to each other and two or more of selection component 202, experiment initiation component 203, and substrate determining component are disposed in different physical objects. For example, the experimental platform device 130 may include a selection component 202 that is a cylinder-shaped knob, an experiment initiation component 203 that is a cube, a flat surface table 204. The flat surface table may include a first sensor 100 (e.g., a color sensor) to determine a type of substrate components 205-207 that is placed on the flat surface table and a second sensor 100 (e.g., gyroscope sensor) to determine the inclination of the flat surface table (e.g., as supported by one of wedges 208-210).

The selection component 202 may be used by the user to determine the amount of water for the erosion experiment. In one implementation, the selection component 202 is a cylinder-shaped knob, where turning selection component 202 clockwise may signify a larger amount of water and turning the selection component 202 counterclockwise may signify a lesser amount of water.

In one implementation, the substrate components 205-207 are magnetic cards with specific patterns (e.g., sand, gravel, rocks, boulders, etc.) that are to be used to determine the type of substrate that the experiment is to use. For example, substrate component 205 signify using sand as the substrate, substrate component 206 may signify using rocks as the substrate, and substrate component 207 may signify using boulders as the substrate. The flat surface table 204 may be transparent and may include a sensor (e.g., a color sensor, an RFID sensor, etc.) to determine a property (e.g., the color, an RFID tag) of a substrate component 205-207 that is placed on the flat surface table 204. In another implementation, a push button switch will be used to select the type of substrate (e.g., through the action of pushing the button multiple times to go through the choices).

In one implementation, the experiment initiation component 203 may be a cube that is to be used by the user to start the experiment (e.g., through the action of tapping the cube).

A computing device 140 (e.g., a tablet) may be used to display the result of the experiment.

Wedges 208-210 may be passive items (e.g., items that do not include sensors 100) that may be used to change the inclination of the flat surface table 204, hence triggering different responses on the experiment. The different inclinations may be determined by a sensor 100 (e.g., gyroscope sensor) in flat surface table 204. The computing device 140 may receive inclination data from the sensor 100 and the computing device 140 (e.g., an application executing on the computing device 140) may use the inclination data to determine a type of erosion animation to display.

Figure 2B:
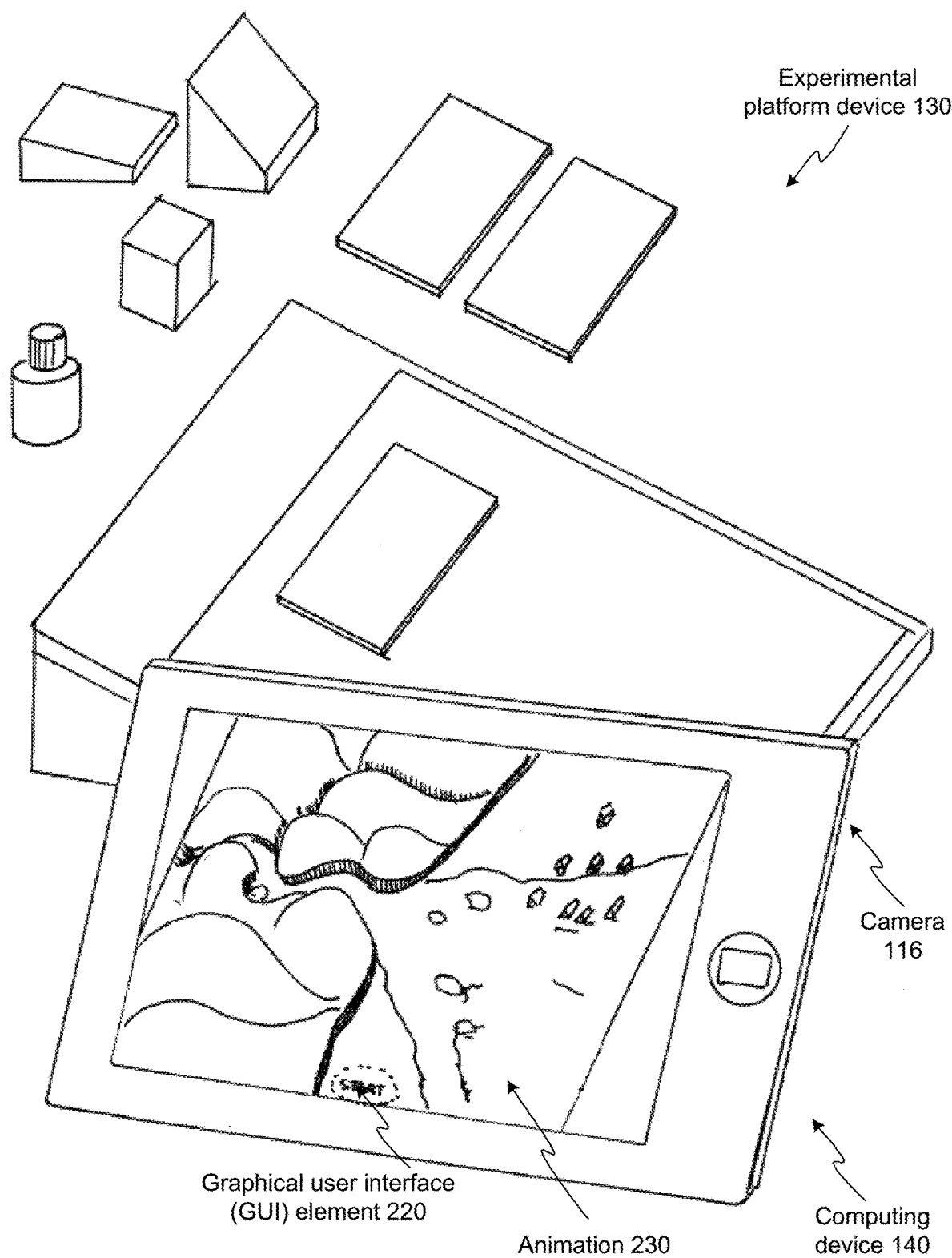
FIG. 2B illustrates a system for modifying an overlay animation for an erosion experiment, in accordance with another implementation of the disclosure.

FIG. 2B illustrates a system for modifying an overlay animation for an erosion experiment, in accordance with another implementation of the disclosure. The computing device 140 may capture a video of the experimental platform device 130 and superimpose, in the video, an overlay animation on a designated area of the experimental platform device (e.g., the computing device 140 may use an Augmented Reality technology). The superimposing of the overlay animation in the video may give a better clarity for the user on the relation between the lesson and the real life. The user may position camera 116 (e.g., rear camera) coupled to the computing device 140 between the experimental platform device 130 and the user. The experimental platform device 130 in FIG. 2B may be the same or substantially similar to the experimental platform device 130 described in relation to FIG. 2A. For example, the experimental platform device 130 of FIG. 2B may include one or more of a flat surface table 204, selection component 202, substrate components 205-207, and wedges 208-210. In one implementation, the experiment may be initiated by interacting with an experiment initiation component 203 of the experimental platform device 130. In another implementation, the experiment may be initiated by receiving user interaction with a graphical user interface (GUI) element 220 (e.g., user selection of a 'Start' button) displayed by the computing device 140 (e.g., on display device 110). In another implementation, a user may interact with either GUI element 220 or experiment initiation component 203 to start the experiment (e.g., GUI element 220 is provided for convenience, since experiment initiation component 203 can still be used to start the experiment). The computing device may superimpose, in the video, an overlay animation 230 of a river flowing on top of a designated area of the experimental platform device 130 via display device 110.

Returning to FIG. 1B, in one implementation, method 150 may be for modifying an overlay animation 230 for an erosion experiment (see FIGS. 2A-B), in accordance with an implementation of the disclosure.

In block 152, the initial independent variable data (e.g., sensor data) may indicate one or more of amount of water, type of substrate, or an inclination. In one implementation, a user may set up the erosion experiment by defining the amount of water in the experiment (e.g., a trickle of rain, a very large flood, etc.), determining the substrate type (e.g., sand, rock, or boulder), and determining the inclination of the rectangular flat surface table 204 (e.g., stream table). In one implementation, selection component 202 may receive user input indicating an amount of water, gyroscope sensor may determine an inclination of the rectangular flat surface table 204, and substrate determining component may determine a substrate component 205-207 that is placed on the rectangular flat surface table 204. The initial independent variable data (e.g., sensor data) may indicate one or more of the amount of water, the inclination, or the type of substrate.

In block 158, once the independent variables of the experiment are set (or the default independent variable data (e.g., sensor data) is determined), the user may start the experiment by interacting with the experiment initiation component 203 (e.g., tapping on the start cube). In another implementation, the computing device may display a GUI element 220 (e.g., a start button) and the user may start the experiment by interacting the GUI element 220 (e.g., pressing the start button).

In block 160, the overlay animation 230 may include an amount of water (e.g., river, beach, rain, etc.) on a substrate (e.g., sand, gravel, rocks, boulders) as indicated by the initial independent variable data. The overlay animation 230 may display the erosion of the substrate by the amount of water (e.g., a specific type of erosion based on the initial independent variable data) on the designated area of the flat surface table 204 and the user can watch how erosion happens.

In block 162, the manipulations of a sensor 100 may include user input. The user input may include one or more of a change in the amount of water (e.g., received via the selection component 202), change in inclination of the rectangular flat surface table 204 (e.g., received via the gyroscope sensor), or change in substrate (e.g., received via the substrate determining component).

In block 164, in response to the independent variable data (e.g., sensor data) indicating a change in amount of water, the overlay animation may be modified to display a modification in the erosion (e.g., more water may cause more erosion). In response to the independent variable data (e.g., sensor data) indicating a change in inclination, the overlay animation may be modified to display a modification in the erosion (e.g., greater inclination may cause more erosion). In response to the independent variable data (e.g., sensor data) indicating a change in substrate, the overlay animation may be modified to display a modification in the erosion (e.g., sand may have more erosion than boulders). The user may modify the experiment and repeat the experiment using different parameters (e.g., one or more of different amounts of water, types of substrate, or inclination).

Figure 3A:
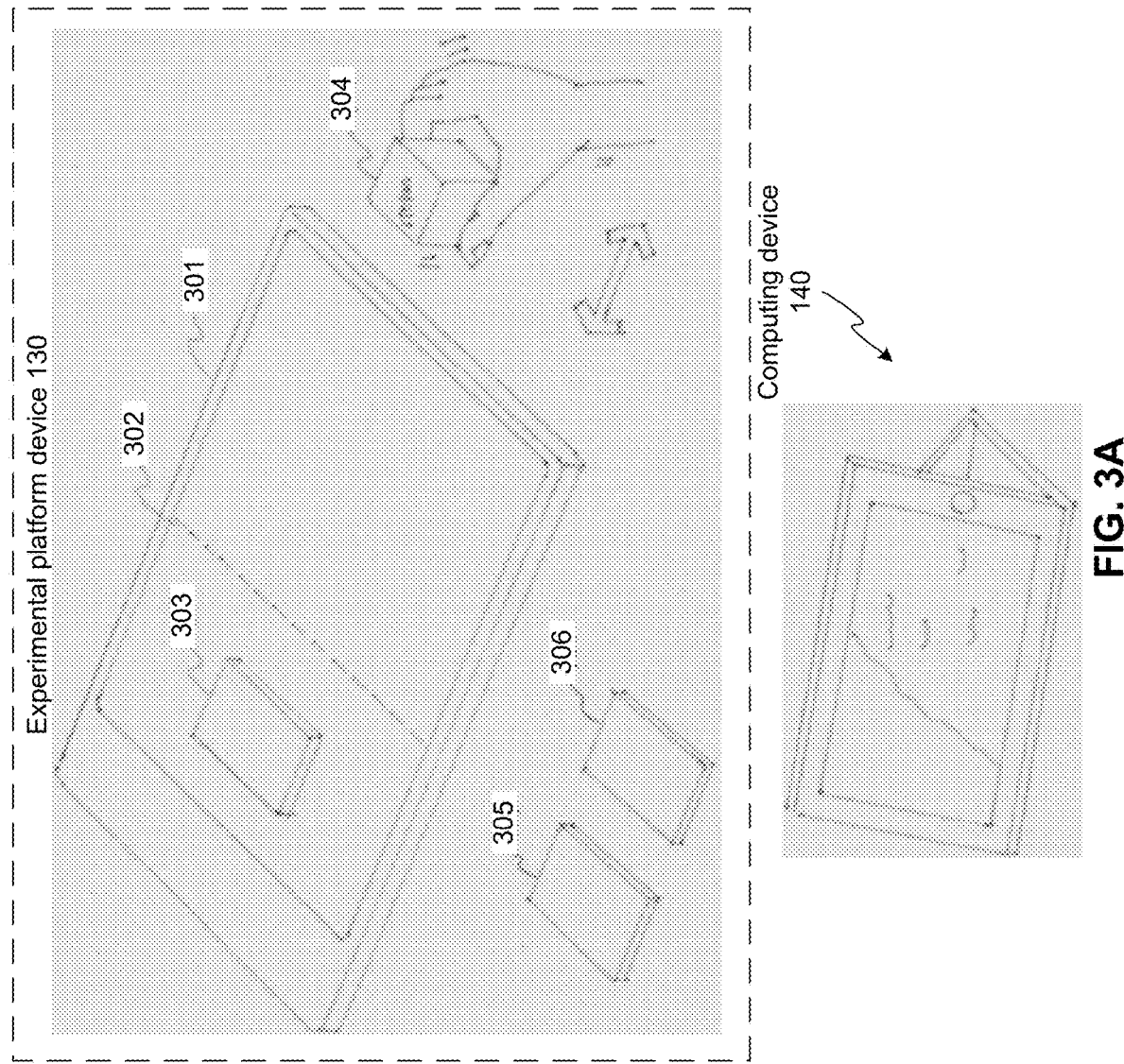
FIG. 3A illustrates a system for modifying an overlay animation for a beach erosion experiment, in accordance with an implementation of the disclosure.
Figure 3B:
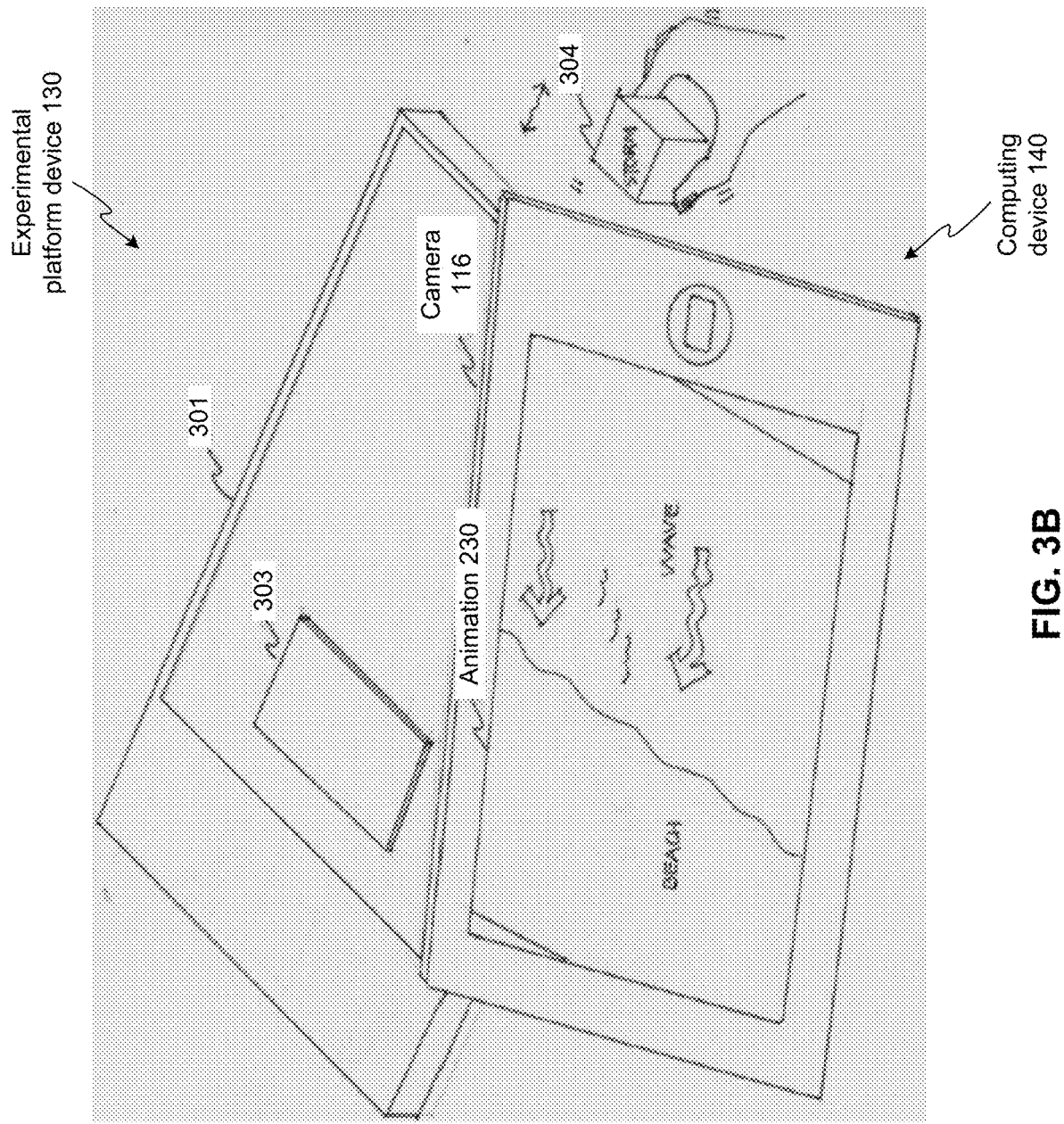
FIG. 3B illustrates a system for modifying an overlay animation for a beach erosion experiment, in accordance with another implementation of the disclosure.

FIG. 3A illustrates a system for modifying an overlay animation for a beach erosion experiment, in accordance with an implementation of the disclosure. In some implementations, the experimental platform device 130 of FIGS. 3A-B is the same as or substantially similar to the experimental platform device 130 of FIGS. 2A-B. Instead of representing the real stream table, the rectangular flat surface 301 may represent a section of a beach, with a line 302 defining the beach line (e.g., the line between the land and the water). In one implementation, the line 302 may be a default line indicated on the rectangular flat surface 301. In another implementation, the line 302 may be input by the user. In one implementation, the substrate components 303-306 (e.g., magnetic cards) may be used to determine the type of substrate (e.g., sand, rocks, coral reef, or others). In another implementation, a push button switch may be used to select the substrate. In one implementation, the user may initiate the erosion via an experiment initiation component 304 (e.g., by shaking the 'erosion factor' cube that has been defined with the factor of erosion). For example, the experiment initiation component 304 may indicate a storm, and the greater user interaction with the experiment initiation component 304 (e.g., higher the intensity of the shaking), the stronger the storm will be.

FIG. 3B illustrates a system for modifying an overlay animation for a beach erosion experiment, in accordance with another implementation of the disclosure. FIG. 3B may be an implementation of the beach erosion lesson using Augmented Reality. The user may view the rectangular flat surface 301 through a computing device 140 coupled to a camera 116 (e.g., a rear-facing camera that is integral to the computing device 140). In response to the user placing a substrate component 303 on the rectangular flat surface 301, the computing device 140 may display a type of beach based on the substrate component (e.g., a sandy beach). The user may initiate the experiment and may provide user input (e.g., shake the experiment initiation component 304) to increase the intensity of the erosion factor (e.g., the intensity of the storm). As the user provides the user input (e.g., shakes the cube), the computing device 140 may display the increased intensity of the erosion factor and the impact to the beach.

Returning to FIG. 1B, in one implementation, method 150 may be for modifying an overlay animation 230 for a beach erosion experiment (see FIGS. 3A-B), in accordance with an implementation of the disclosure.

In block 152, the initial independent variable data (e.g., sensor data) may indicate one or more of the intensity of the storm or the type of substrate. In one implementation, a user may set up the beach erosion experiment by defining the intensity of the storm and the type of substrate. In one implementation, experiment initiation component 304 may receive user input indicating an intensity of storm and substrate determining component may determine a substrate component 303-306 that is placed on the rectangular flat surface 301.

In block 158, once the independent variables of the experiment are set, the user may start the experiment by interacting with the experiment initiation component 304 (e.g., tapping on the start cube). In another implementation, the computing device may display a GUI element (e.g., a start button) and the user may start the experiment by interacting the GUI element (e.g., pressing the start button).

In block 160, the overlay animation 230 may include an intensity of a storm on a substrate (e.g., sand, gravel, rocks, boulders) as indicated by the initial independent variable data. The overlay animation 230 may display the beach erosion of the substrate by the intensity of storm (e.g., a specific type of beach erosion based on the initial independent variable data) on the designated area of the flat surface 301 and the user can watch how beach erosion happens.

In block 162, the manipulations of a sensor 100 may include user input. The user input may include one or more of a change in intensity of the storm (e.g., received via the experiment initiation component 304) or change in substrate (e.g., received via the substrate determining component).

In block 164, in response to the independent variable data (e.g., sensor data) indicating a change in intensity of storm, the overlay animation may be modified to display a modification in the beach erosion (e.g., more intense storm may cause more erosion). In another implementation, in response to the independent variable data (e.g., sensor data) indicating a change in substrate, the overlay animation may be modified to display a modification in the erosion (e.g., sand may have more erosion than boulders). The user may modify the experiment and repeat the experiment using different parameters (e.g., one or more of different amounts of water, types of substrate, or inclination). For example, if previously a storm is chosen as the 'erosion factor', then user can watch the effect of shaking the cube on the display device 110 with increasing storm on the beach and the impact in the beach erosion.

The present disclosure includes a learning system where instructors and students may work collaboratively as the students learn the lessons. Students may be the main user of the experimental platform device 130 and the computing device 140 (e.g., the software executing on the computing device 140). Instructors may be secondary users that interact with the system (e.g., getting reports and notifications from the student activities).

FIG. 4 is a flow diagram illustrating an example method 400 for modifying an overlay animation, in accordance with another implementation of the disclosure. Method 400 illustrates user experience as they use the experimental platform device 130 and computing device 140 (e.g., an application executing on the computing device 140) to learn a subject. The user may experience independent learning and if the user has difficulty, the educator may be notified so that the educator can give instructional scaffolding to the user.

Method 400 may be performed by one or more processing devices of a server device that is coupled to a computing device 140 and an instructor computing device for modifying an overlay animation. For example, method 400 may be performed by software executing on the one or more processing devices. In one implementation, the computing device 140 may be the server device. In another implementation, the instructor computing device may be the server device.

Method 400 may begin at block 402 where the processing device may provide, to a computing device 140 associated with a user, a corresponding problem of a series of problems to solve and a corresponding experiment to perform using an experimental platform device 130. For example, corresponding problem may be whether a greater inclination affects rate of erosion and the corresponding experiment is to perform an erosion experiment with experimental platform device 130 a first wedge 208 and with a second wedge 209. The processing device may direct the user to use the experimental platform device 130 to perform the corresponding experiment before answering the corresponding problem.

At block 404, the processing device may receive, from the computing device 140, a corresponding answer to the corresponding problem.

At block 406, the processing device may determine whether the corresponding answer is correct. In response to determining that the corresponding answer is correct, flow may continue to block 402 to provide the next corresponding problem of the series of problems to solve and the next corresponding experiment to perform using the experimental platform device 130. In response to determining that the corresponding answer is not correct, flow may continue to block 408.

At block 408, the processing device may provide, to the computing device 140, an additional experiment to perform using the experimental platform device 130 and media related to the corresponding problem. For example, the processing device may provide videos and reading to the user regarding inclination and erosion. The processing device may direct the user to perform additional experiments regarding inclination and erosion.

At block 410, the processing device may provide, to the computing device 140, an additional problem related to the corresponding problem (e.g., the corresponding problem that the user incorrectly answered). For example, the additional question may be whether the first wedge 208 or the second wedge 209 caused greater erosion. The processing device may provide the additional problem after the user completes the additional experiment and consumes the media related to the corresponding problem (e.g., watches the video, reads the reading material, etc.).

At block 412, the processing device may receive, from the computing device 140, an additional answer to the additional problem.

At block 414, the processing device may determine whether the additional answer is correct (e.g., whether the user mastered the problem). In response to determining that the additional answer is correct, flow may continue to block 402 to provide the next corresponding problem of the series of problems to solve and the next corresponding experiment to perform using the experimental platform device 130. In response to determining that the additional answer is not correct, flow may continue to block 416.

At block 416, the processing device may provide, to an instructor computing device, a notification related to the user. The notification may alert the instructor that the user has been incorrectly answering questions regarding inclination and erosion. The processing device may direct the user to the instructor for educational scaffolding (e.g., instructional techniques to move the user progressively towards stronger understanding and independence in the learning process). The instructor may provide offline intervention (e.g., teaching) to help the user understand the corresponding problem and corresponding experiment. For example, the instructor may help the user understand about inclination and erosion. The processing device may receive, from the instructor computing device, an indication that the user can proceed to the next corresponding problem of the series of problems.

Results (e.g., answers to questions, whether the answers were correct, etc.) that a user experiences may be captured by the server device and may allow an instructor to review the results in real time or at a later point in time to better understand the ability of the users. The server device employs machine learning to process the data into information that an instructor can use to better understand users, user ability, and areas in which the users need help. The server device may include logic to process the data as illustrated in Table 1, which is one simple implementation of a tagging system. Each question may be tagged with a corresponding complexity or difficulty level and with topics or goals relevant to the topic. Table 1 illustrates levels of complexity of topics of experiments associated with modifying an overlay animation, in accordance with an implementation of the disclosure.

TABLE 1

| Questions | Difficulties | Topic 1 | Topic 2 | Topic 3 | Topic 4 | Topic 5 |
|---|---|---|---|---|---|---|
| 1 | Easy | * | * | | | * |
| 2 | Easy | | * | * | | |
| 3 | Easy | | * | | * | |
| 4 | Easy | * | | * | * | |
| 5 | Medium | | * | * | | |
| 6 | Medium | | * | | * | |
| 7 | Medium | | * | * | | |
| 8 | Medium | * | | | * | * |
| 9 | Medium | | | * | | * |
| 10 | Difficult | | * | | * | |
| 11 | Difficult | | * | * | | * |
| 12 | Difficult | * | | | | * |
| 13 | Difficult | | | * | | |
| 14 | Proficient | | * | | * | |
| 15 | Proficient | | * | * | * | |
| 16 | Proficient | * | | * | | |
| 17 | Advanced | | | * | * | * |
| 18 | Advanced | * | | * | | |
| 19 | Advanced | * | * | | * | |
| 20 | Advanced | | * | | * | * |

The logic may be used by the method 400, so that for any incorrect answer from the user, the server device will know which other question with similar characteristic (e.g., additional question related to the corresponding question that was incorrectly answered) that can be given to the student after they perform the learning activity. The server device may use the logic so that the topics (e.g., topics 1-5 of Table 1) or goals are being covered for the users.

The server device may also employs an Adaptive Learning system such that users with higher ability may be able to experience greater learning experience by receiving more complex and difficult problems to solve. Users that struggle with a topic may receive questions that are relevant to their skillsets (e.g., problems related to basic understanding).

Table 2 illustrates levels of a lesson that includes modifying an overlay animation, in accordance with an implementation of the disclosure.

TABLE 2

| | |
|---|---|
| Level 1 | Storytelling |
| Level 2 | Basic Science Learning module |
| Level 3 | Applied Science Learning module |
| Level 4 | Project-based Learning module |

The computing device 140 may provide levels (e.g., levels 1-4) for a user to complete as the user completes a lesson (e.g., levels that a user will play as they learn the lesson). The levels may induce gamification in the learning and may increase the engagement of the users. The computing device may introduce users to the experimental platform device and provide a story (e.g., via audio, text, video, etc.) relevant to the lesson in level 1. In level 2, the computing device may provide basic science learning problems to a user and provide points as the user correctly solves each problem. In response to the computing device 140 determining that the user has received a threshold amount of points, the computing device 140 may advance the user level 3. At level 3, the computing device 140 may challenge and teach the user on the applied science. The computing device 140 may provide problems in level 3 and provide points as the user correctly answers the problems. In response to the computing device 140 determining that the user has received a threshold amount of points, the computing device 140 will move the user to level 4. Levels 1-3 may include individual activities and learning. Level 4 may invoke teamwork and collaboration between users, where the users may receive a complex problem and may have to solve it by working together with other users.

Figure 5A:
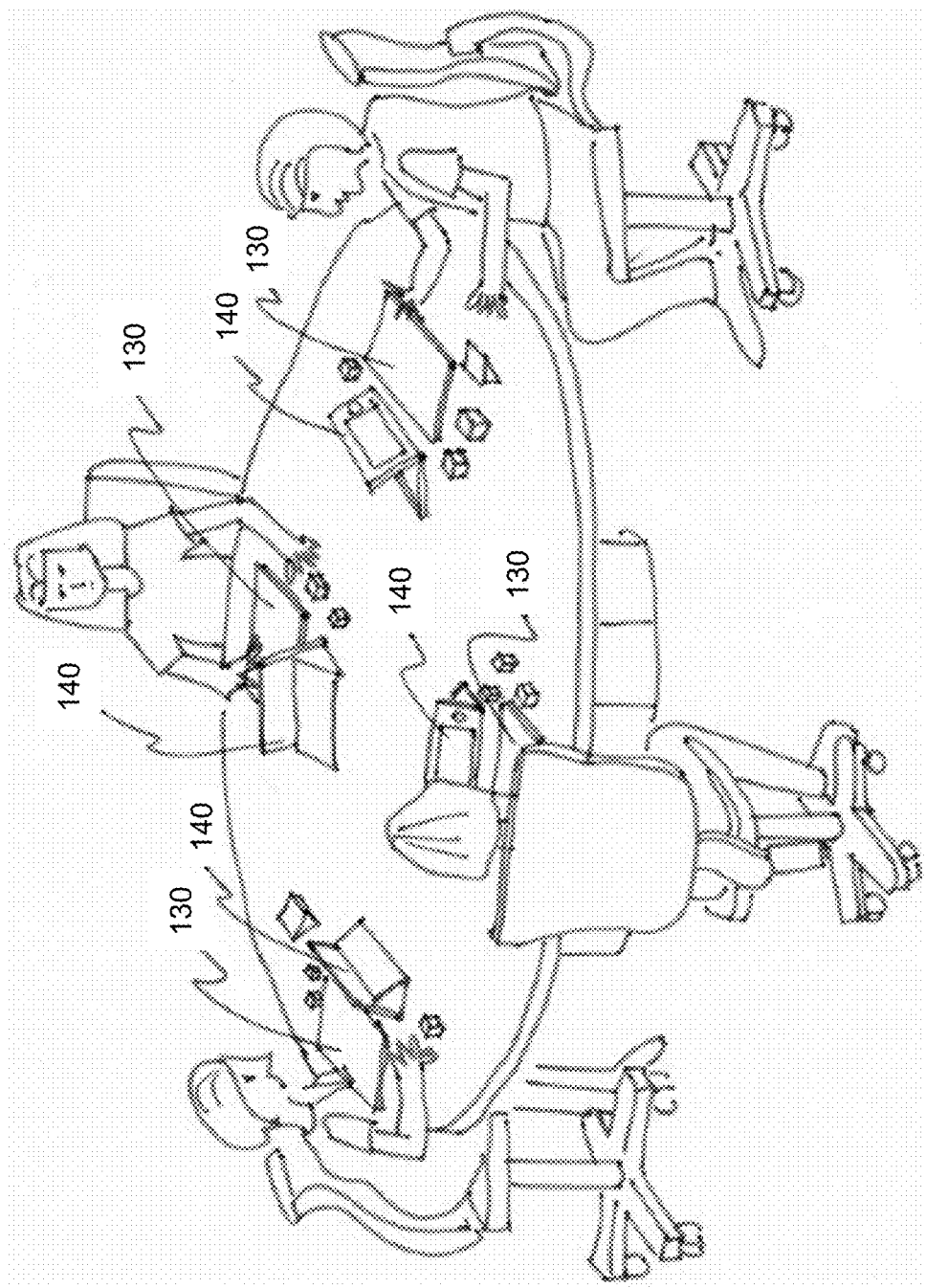
FIGS. 5A-B illustrate use of the system to modify an overlay animation for different ways of utilizing the experimental platform device in the classroom, in accordance with implementations of the disclosure.
Figure 5B:
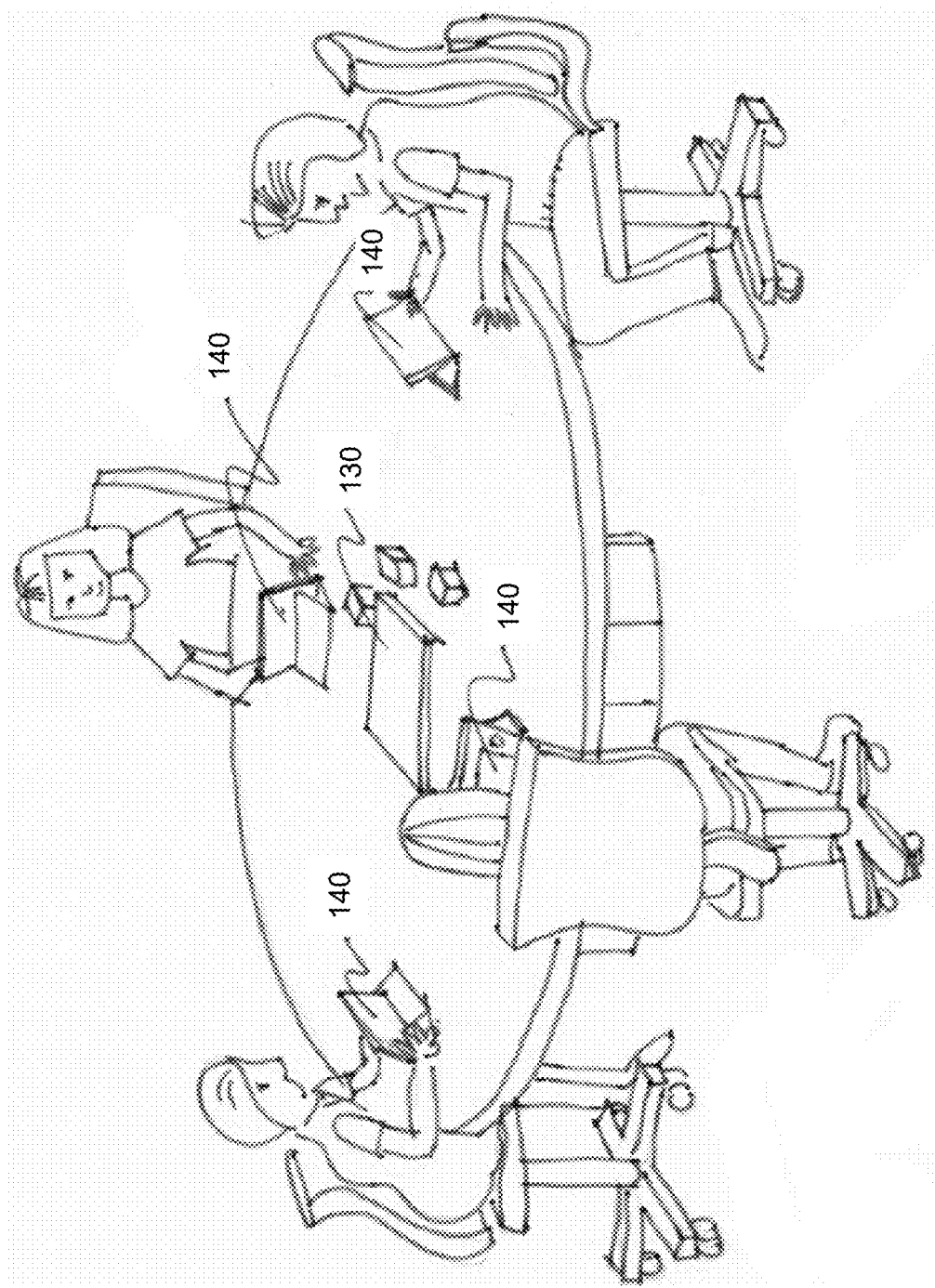

FIGS. 5A-B illustrate use of the system to modify an overlay animation, in accordance with implementations of the disclosure. In one implementation, FIGS. 5A-B illustrates how the experimental platform device 130 may be used in classroom. FIG. 5A illustrates one implementation where each user has their own experimental platform device 130 and computing device 140. Each user may perform the activities and learning in levels 1-3 at their own pace with their own experimental platform device 130 and computing device 140. The users may work as a team when the users reach level 4.

FIG. 5B illustrates another implementation where the users have their own computing device 140 and share a common experimental platform device 130. The users take turn connecting the experimental platform device 130 to their own computing device 140 whenever they need to perform experiments. User answers may be recorded individually at their own related session on their own computing device 140, hence their learning experience will still be tracked individually and the teacher will still be able to understand each individual student's knowledge. In another implementation, there may be a common computing device 140 shared among the users. Each student may identify themselves before using the common computing device 140.

Figure 6:
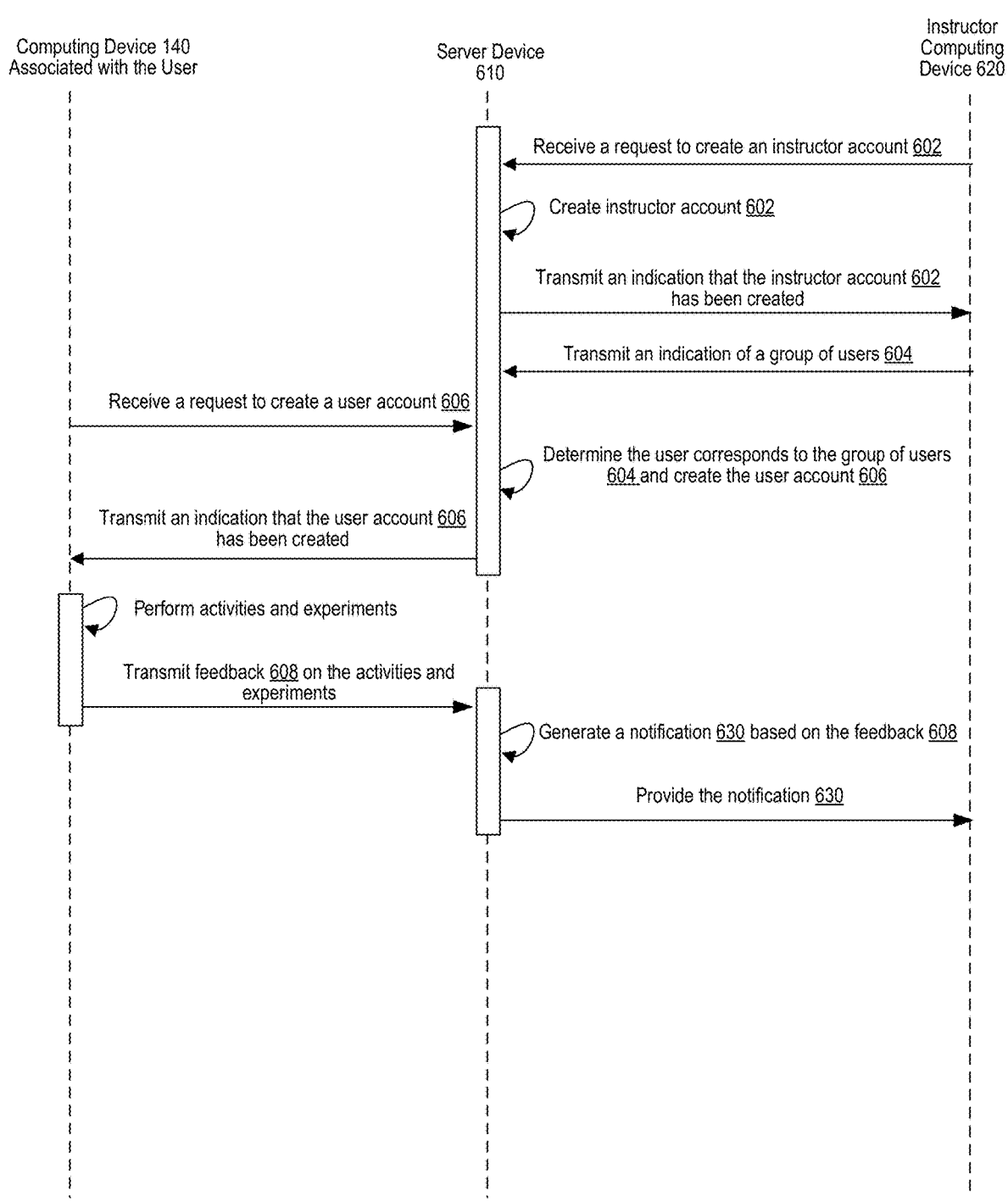
FIG. 6 is a flow diagram illustrating interaction between students and teachers to modify an overlay animation, in accordance with an implementation of the disclosure.

FIG. 6 depicts a sequence diagram 600 illustrating interaction between students and instructors, in accordance with an implementation of the disclosure. As depicted, the sequence diagram 600 includes interactions between the computing device 140 associated with the user, a server device 610, and an instructor computing device 620. In one implementation, the server device 610 and the instructor computing device 620 are the same device. In another implementation, the server device 610 and the computing device 140 are the same device. In another implementation, the computing device 140, server device 610, and the instructor computing device 620 are separate devices.

Each lesson may use a User Account System such that every user will have their own account, whether the users are students or educators (e.g., instructor, teacher). The instructor may start the process.

The server device 610 may receive a request from the instructor computing device 620 to create an instructor account 602. An instructor account 602 may provide functionalities which may include one or more of group creation functionality, notifications functionality, etc. Group creation functionality may allow an instructor to create a group (e.g., a group of students in the classroom of the instructor). Notifications functionality may allow an instructor to receive notifications of a student passing a milestone in the lesson. Notifications may include one or more of a success notification (e.g., passing a level) or a help-needed notification (e.g., indicating that a student needs help). The instructor may use the help-needed notification to understand which students need help and to provide educational scaffolding to the students that need help.

The server device 610 may create the instructor account 602 and transmit an indication to the instructor computing device 620 that the instructor account has been created. The server device 610 may receive an indication of a group of users (e.g., an indication of students of a class) from the instructor computing device 620.

The server device 610 may receive a request to create a user account 606 from the computing device 140 associated with a user. The server device 610 may determine that the user corresponds to the group of users 604. In response to determining that the user corresponds to the group of users 604, the server device 610 may create a user account 606 for the user. The server device 610 may transmit an indication to the computing device 140 that the user account 606 has been created. A user account 606 may provide functionalities which may include one or more of device functionalities, lesson functionalities, etc. Device functionalities may allow the user to interact with the experimental platform device 130. Lesson functionalities may allow the user to perform experiments, receive and answer questions, consume videos and reading materials, etc.

The computing device 140 may perform activities and experiments. The activities and experiments may include one or more of performing an experiment with an experimental platform device 130, answering questions (see FIG. 4), consuming media (e.g., watching videos and reading text), etc.

The server device 610 may receive feedback 608 based on the activities and experiments from the computing device 140. The feedback may include one or more of a level passed by the user, questions correctly answered by the user, questions incorrectly answered by the user, experiments completed, media consumed, etc.

The server device 610 may generate a notification 630 based on the feedback 608. The server device 610 may provide the notification 630 to the instructor computing device 620. For example, the server device 610 may provide a notification 630 to the instructor computing device that the user has incorrectly answered questions (e.g., instructor intervention is needed).

Figure 7A:
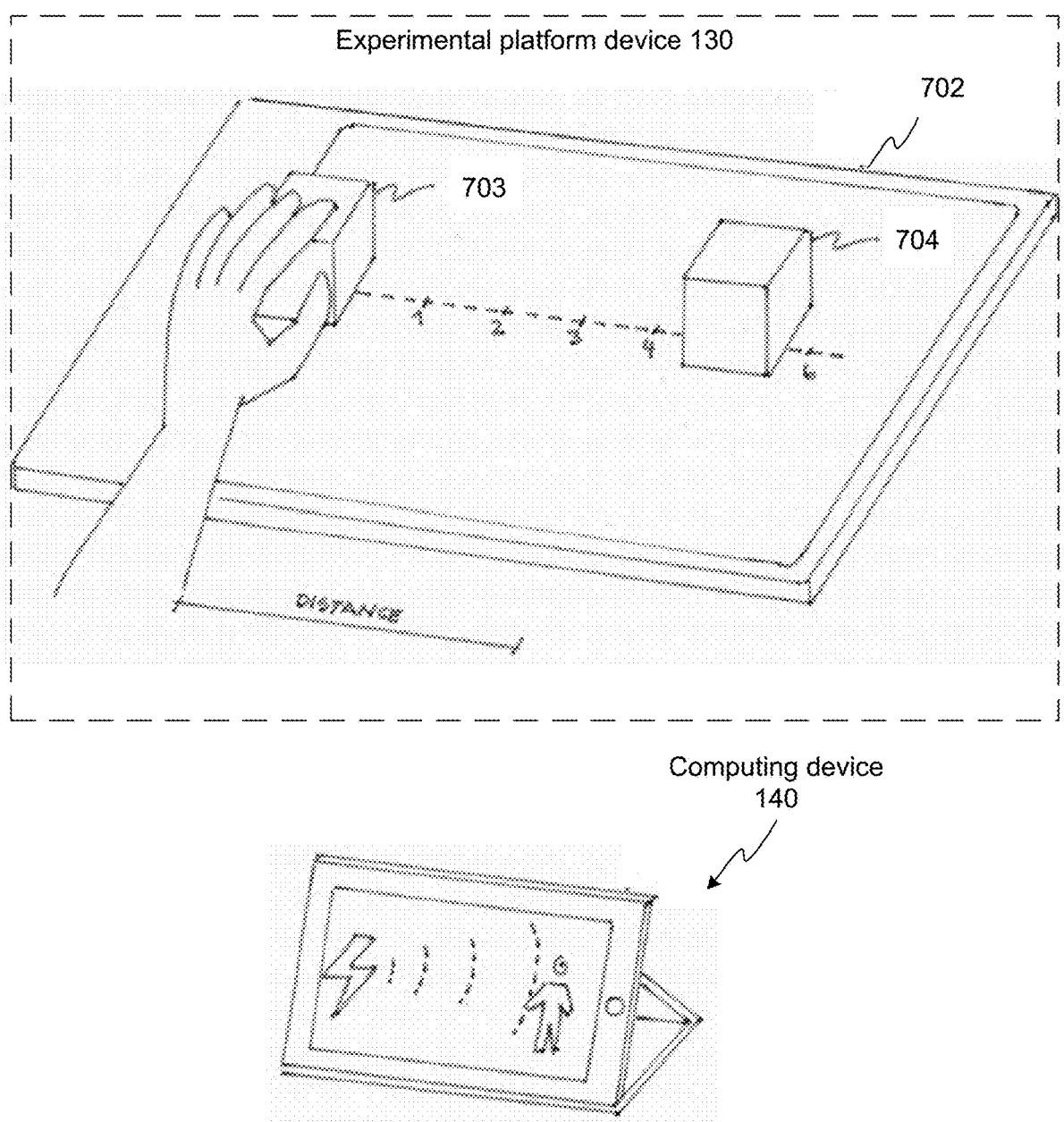
FIG. 7A illustrates a system for modifying an overlay animation for a soundwave experiment, in accordance with an implementation of the disclosure.

FIG. 7A illustrates a system for modifying an overlay animation for a soundwave experiment, in accordance with an implementation of the disclosure. The system may include an experimental platform device 130 and a computing device 140. The experimental platform device 130 may provide independent variable data (e.g., sensor data) indicating a distance to the computing device 140. In one implementation, the experimental platform device 130 includes a flat surface 702, an emitter component 703 (e.g., an emitter cube), and a receiver component 704 (e.g., a receiver cube). In one implementation, the emitter component 703 and the receiver component 704 are placed on a flat surface 702. The flat surface may have distance markings for positioning of the emitter component 703 and the receiver component 704. The user may interact with (e.g., make a tapping motion) on the emitter component 703 and the computing device 140 may display the result via the display device 110. One or more of the flat surface 702, the emitter component 703, and the receiver component 704 may include a processing device (e.g., microcontroller), a communication device (e.g., with Bluetooth®, Wi-Fi®, and/or OTA ability), a distance sensor, a hall effect sensor, and/or a string of individually-controlled LEDs.

Figure 7B:
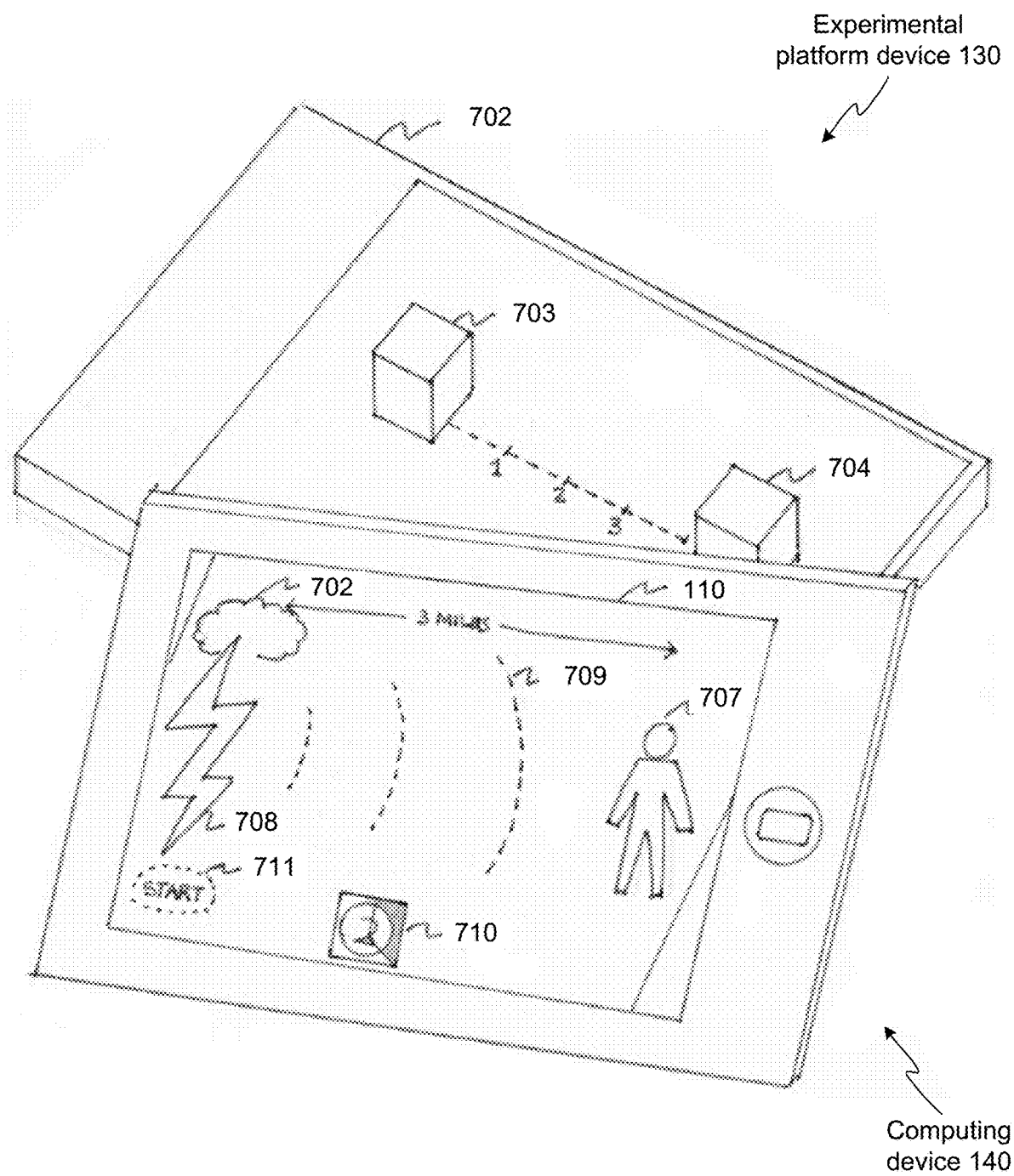
FIG. 7B illustrates a system for modifying an overlay animation for a soundwave experiment, in accordance with another implementation of the disclosure.

FIG. 7B illustrates a system for modifying an overlay animation for a soundwave experiment, in accordance with another implementation of the disclosure (e.g. an implementation of the soundwave lesson using Augmented Reality). A camera 116 may be coupled to a computing device 140 and the camera 116 may be directed at the experimental platform device 130. The computing device 140 may capture, via the camera 116, a video of the experimental platform device 130. The computing device may superimpose an overlay animation on the video of the experimental platform device.

For example, the computing device 140 may superimpose a cloud animation 706 on the emitter component 703 and a person animation 707 on the receiver component 704. In response to receiving user input to start the experiment (e.g., the user tapping on the Start button 711 on the display device 110, the user tapping on the emitter component 703), the computing device 140 may modify the overlay animation to display lightning 708 striking from the cloud animation 706. The computing device 140 may further modify the overlay animation to display a counter 710 of seconds and a wave 709 moving from the lightning 708 to the person 707. The computing device 140 may further provide a sound of thunder via the audio output device 114 and a visual representation of the person 707 hearing the thunder. The computing device 140 may further cause the experimental platform device 130 (e.g., receiver component 704) to provide a sound of thunder via an audio output device 103.

Figure 7C:
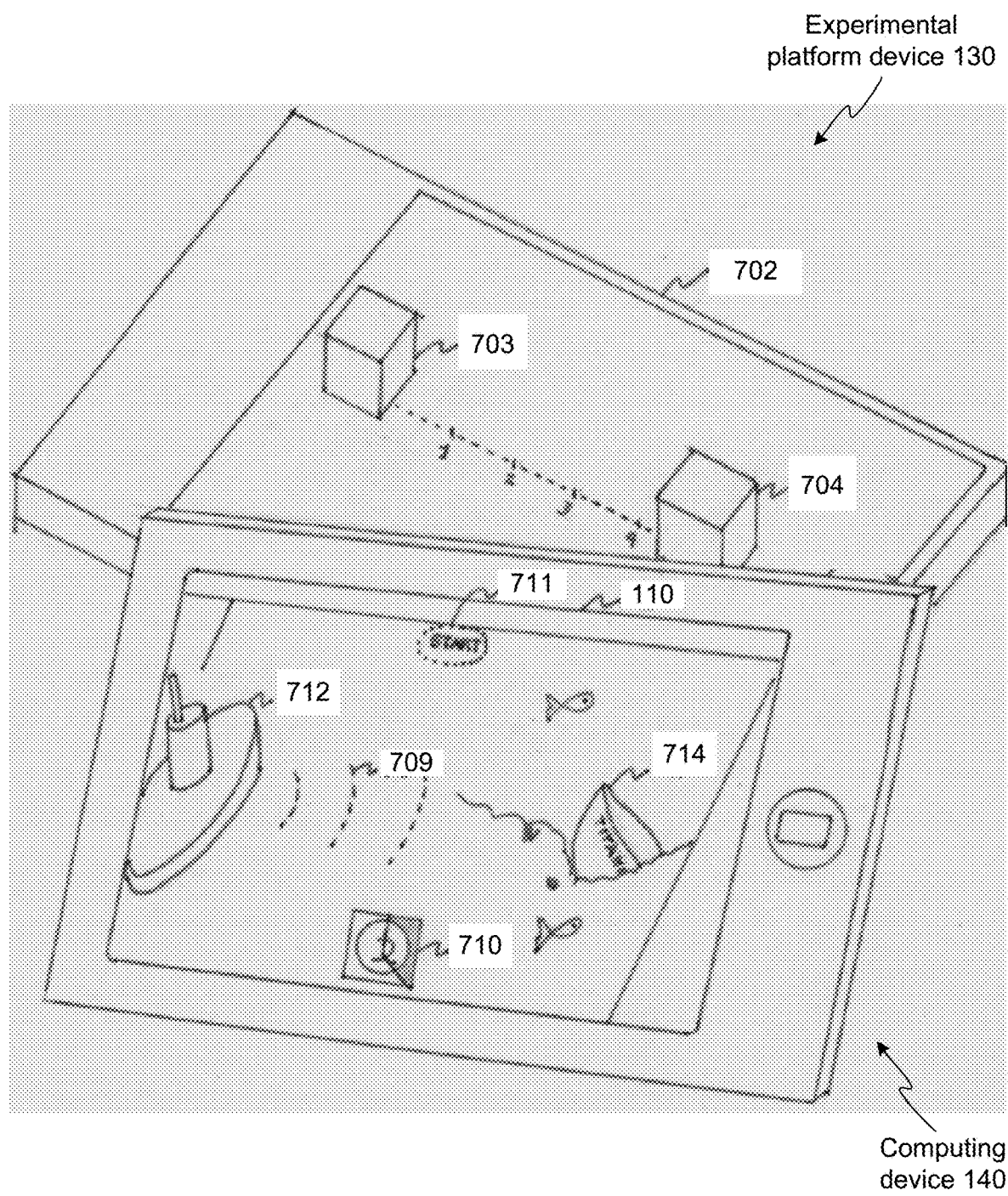
FIG. 7C illustrates a system for modifying an overlay animation for a sonar experiment, in accordance with an implementation of the disclosure.

FIG. 7C illustrates a system for modifying an overlay animation for a sonar experiment, in accordance with an implementation of the disclosure. The components in FIG. 7C may be similar to those shown in FIG. 7B. A submarine animation 712 may be superimposed on the emitter component 703 to represent the source of the sonar signal. A sunken ship animation 714 may be superimposed on the receiver component 704. In response to user input to start the experiment (e.g., when the user starts the experiment by touching the start button 711 displayed via the display device 110), the computing device 140 will display a wave (e.g., a sonar wave) moving from the submarine animation 712 to the sunken ship animation 714. A counter 710 may indicate the timespan as the wave moves.

Returning to FIG. 1B, in one implementation, method 150 may be for modifying an overlay animation 230 for a soundwave experiment (see FIGS. 7A-C), in accordance with an implementation of the disclosure.

In block 152, the initial independent variable data (e.g., sensor data) may indicate one or more of a distance or a first location and a second location. In one implementation, a user may set up the soundwave experiment by defining the distance. For example, a user may place the emitter component 703 and the receiver component 704 on a flat surface 702. The computing device 140 may determine a distance from information received from the experimental platform device 130 regarding the locations (e.g., relative locations) of the emitter component 703 and the receiver component 704 on a flat surface 702.

In block 158, once the independent variables of the experiment are set, the user may start the experiment by interacting with the emitter component 703, the receiver component 704, or the flat surface 702 (e.g., tapping on the emitter component 703). In another implementation, the computing device may display a GUI element (e.g., a start button 711) and the user may start the experiment by interacting the GUI element (e.g., pressing the start button).

In block 160, the overlay animation may include a first graphical representation of the emitter component 703 at a first location and a second graphical representation of the receiver component 704 at a second location. The overlay animation may display a wave 709 from the first graphical representation to the second graphical representation and the user can watch how soundwaves work.

In block 162, the manipulations of a sensor 100 may include user input. The user input may include one or more of a change in distance (e.g., received by changing the location of the emitter component 703 or the receiver component 704).

In block 164, in response to the independent variable data (e.g., sensor data) indicating a change in distance, the overlay animation may be modified to display a modification in the soundwaves (e.g., smaller distance may cause the soundwaves to reach the receiver component faster). The user may modify the experiment and repeat the experiment using different parameters (e.g., different distances). In one implementation, in response to the soundwave reaching the second graphical representation displayed in the overlay animation, the computing device 140 may cause the experimental platform device 130 (e.g., receiver component 704, flat surface 702) to simultaneously emit a sound.

FIGS. 8A-D illustrate a system for modifying an overlay animation for an astronomy experiment, in accordance with implementations of the disclosure. The experimental platform device 130 may include a flat surface 810 including cavities 815, a second object 820, and a third object 830. The experimental platform device 130 may be used to display the Earth-sun-moon system, eclipses of the sun and moon, seasons, etc. The flat surface 810 may be a rectangular platform for positioning the sun, moon, and Earth. The sun may be a static object at the center of the upper surface of the flat surface 810. The flat surface 810 may include cavities 815, where each cavity is from an upper surface of the flat surface 810 to a respective sensor 100 disposed within the flat surface 810. The second object 820 may include a spherical portion representing Earth and a cylindrical portion (e.g., a conductor) that fits within the cavity 815 and engages with a respective sensor 100 (e.g., connects a circuit in the flat surface 810). The second object may be capable of tilting and/or rotating. The third object 830 may represent a person or a location that can be placed on the second object 820. The second object 820 may determine the tilt of the second object 820 and the location of the third object 830 on the second object 820. For example, the second object 820 may include a power source, a processing device (e.g., microcontroller), a capacitance sensor, and a gyroscope sensor. The second object 820 may detect location of the third object 830 on the second object 820 (e.g., via the capacitance sensor) and transmit an indication of the location to the flat surface 810 or the computing device 140. The second object 820 may determine the tilt of the second object 820 (e.g., via the gyroscope sensor) and transmit an indication of the tilt to the flat surface 810 or the computing device 140.

The computing device 140 may receive position data (e.g., from flat surface 810 and/or second object 820) including one or more of tilt of the second object 820, location of the third object 830 on the second object, the sensor 100 in the flat surface 810 with which the second object 820 has engaged. In one implementation, the computing device 140 may determine a season from the position data.

Figure 8B:
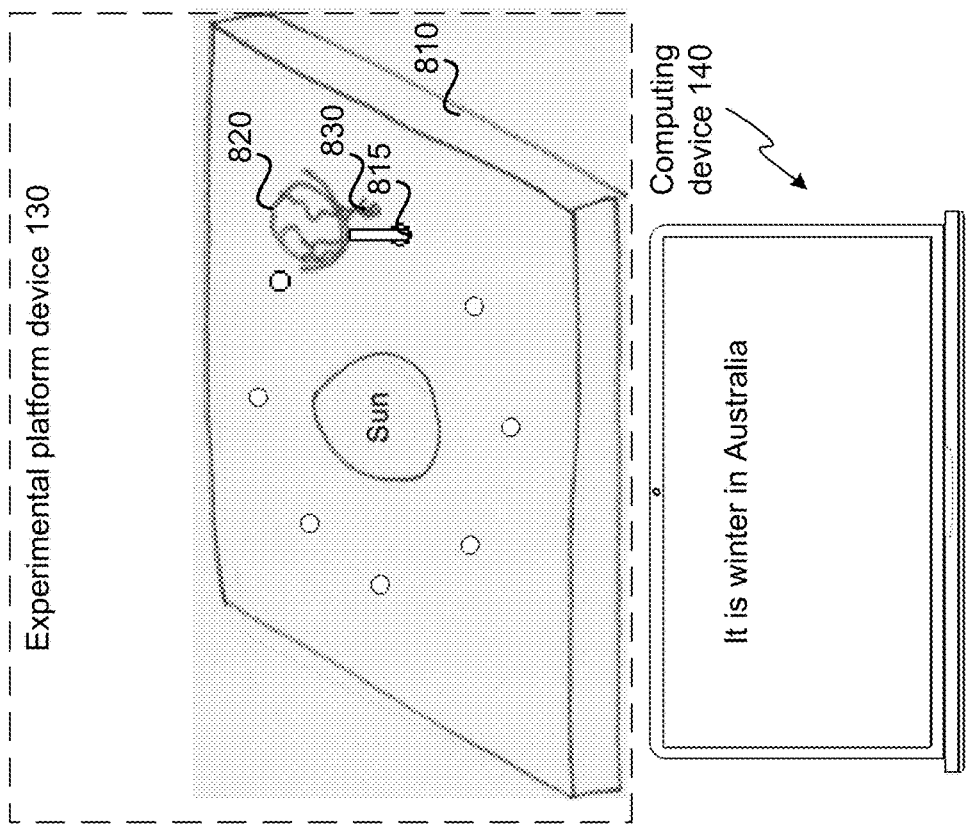
FIGS. 8A-D illustrate a system for modifying an overlay animation for an astronomy experiment, in accordance with implementations of the disclosure.
Figure 8A:
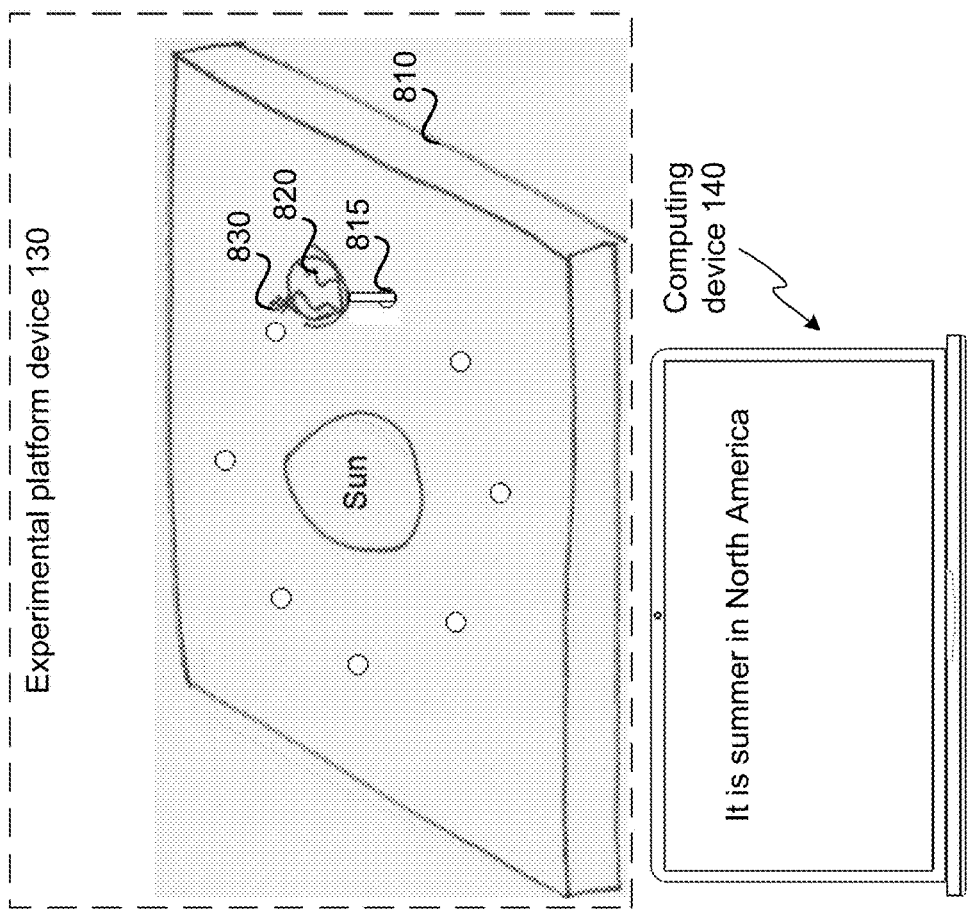

In FIG. 8A, the computing device 140 may determine that the location of the third object 830 on the second object 820 corresponds to North America and the tilt of the second object 820 corresponds to summer in North America. The computing device may display text, an image, and/or an animation including "it is summer in North America."

In FIG. 8B, the computing device 140 may determine that the location of the third object 830 on the second object 820 corresponds to Australia and the tilt of the second object 820 corresponds to winter in Australia. The computing device may display text, an image, and/or an animation including "it is winter in Australia."

In implementations, the second object 820 may be coupled to a fourth object 840 and a fifth object 850. The fourth object 840 may be a spherical object the represents a moon. The second object 820 and the fourth object 840 may include a microcontroller with Bluetooth®, Wi-Fi®, and/or OTA ability, a gyroscope sensor, a capacitive sensor, a switch to turn on the respective object, a power source, a LED, and/or a speaker.

The fifth object 850 may be a mechanism that can adjust the location of the fourth object 840 relative to the second object 820. The fifth object 850 may be a circular platform (e.g., forming a circle, forming a portion of a circle) that is coupled to the cylindrical portion of the second object 820. The fifth object 850 may be titled from the horizontal plane to depict the actual moon plane which is not in the same plane as the actual Earth plane (e.g., the pane of orbit of the moon is not the same as the Earth-sun orbital plane). The experimental platform device 130 may receive position data (e.g., from flat surface 810 and/or second object 820) including one or more of location of the fourth object 840 relative to the second object 820 or the sensor 100 in the flat surface 810 with which the second object 820 has engaged.

Figure 8D:
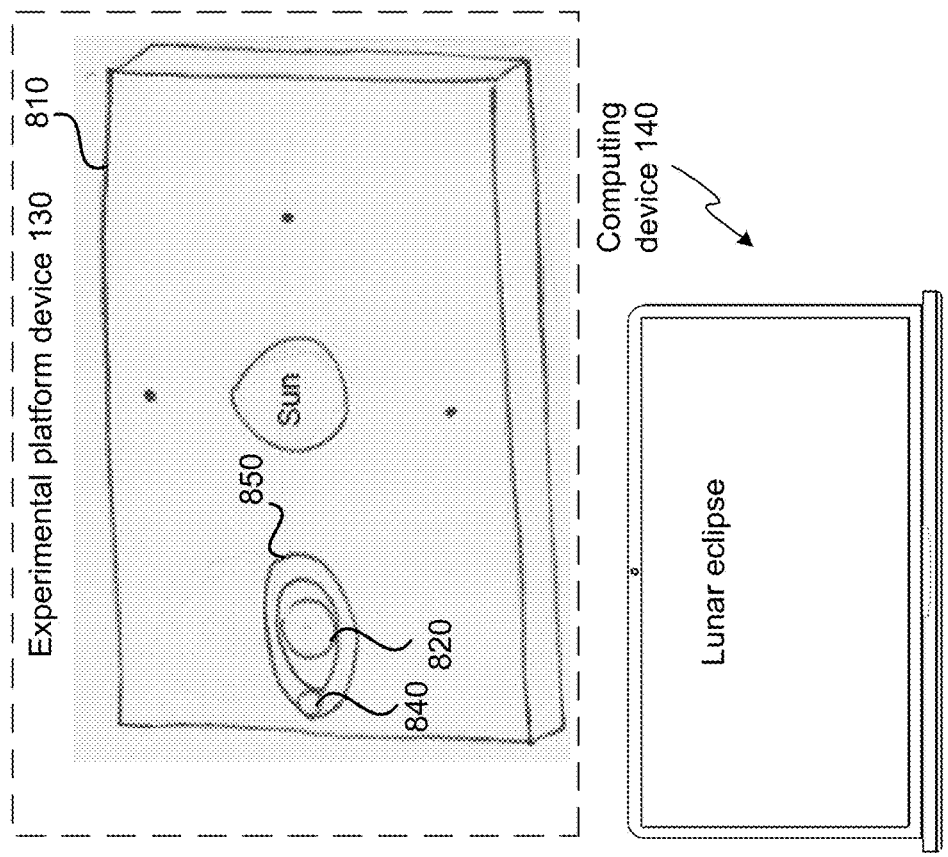
Figure 8C:
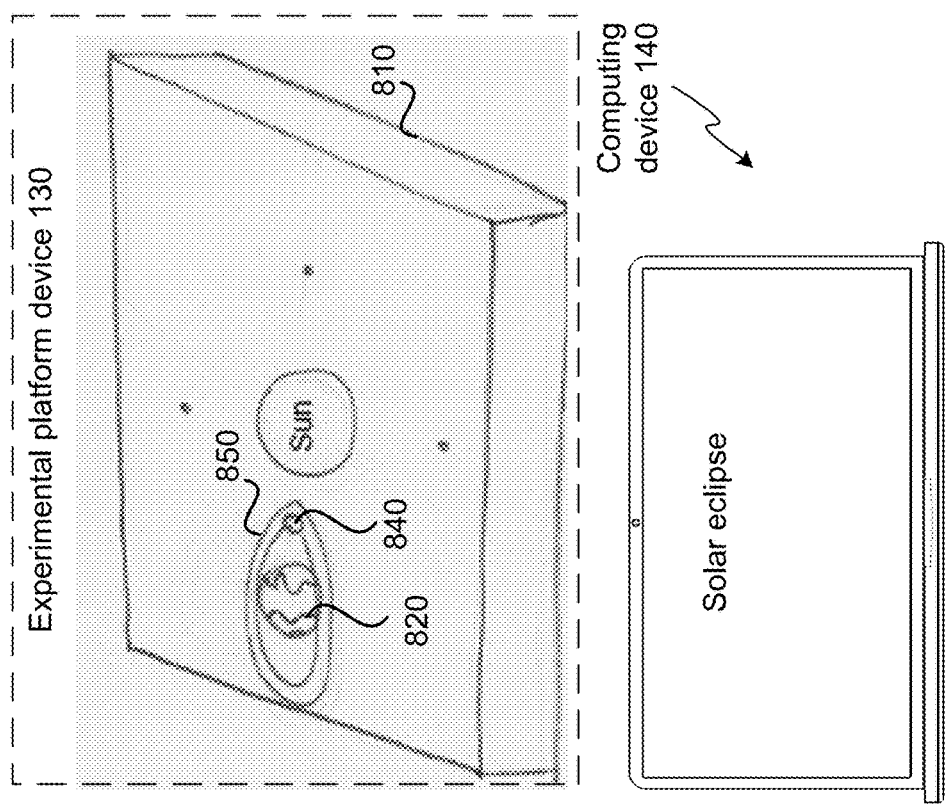

In FIG. 8C, the computing device 140 may determine that there is a solar eclipse in response to determining the location of the fourth object 840 and the second object 820. The computing device 140 may display text, an image, and/or an animation representing a solar eclipse.

In FIG. 8D, the computing device 140 may determine that there is a lunar eclipse in response to determining the location of the fourth object 840 and the second object 820. The computing device 140 may display text, an image, and/or an animation representing a lunar eclipse.

The computing device 140 in FIGS. 8A-D may modify, in a video of the experimental platform device 130, an overlay animation superimposed on a designated area of the experimental platform device 130 based on independent variable data (e.g., location data). The overlay animation may include an animation of the sun, Earth, and/or moon overlaid on the experimental platform device 130. The animation may display the Earth rotating, the moon orbiting around the Earth (e.g., but not rotating), the sun glowing, etc. In implementations, the computing device 140 may receive user input to view the animation from a perspective not from the surface of Earth (e.g., a perspective from a spaceship) or a perspective from the surface of Earth (e.g., perspective from a human standing on Earth).

Figure 8E:
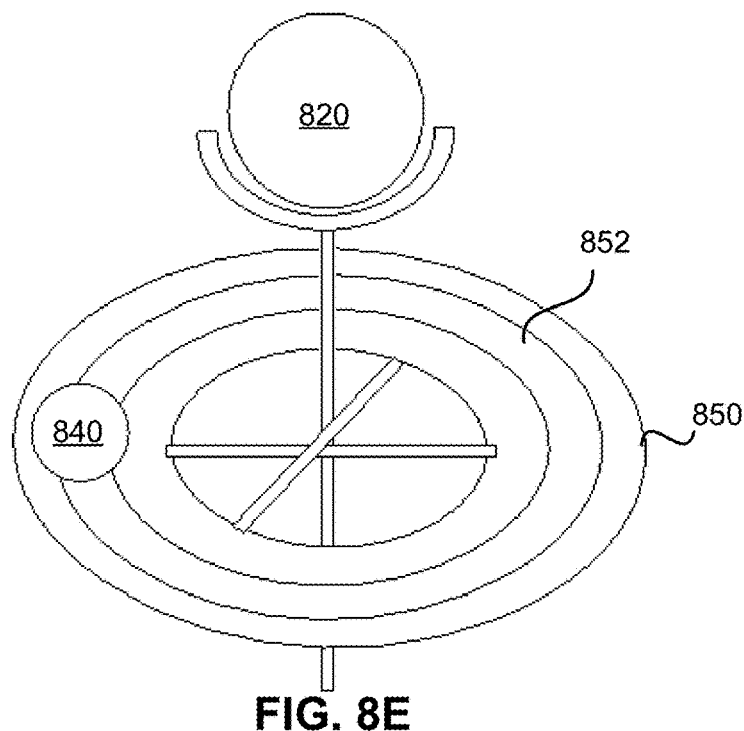
FIGS. 8E-G illustrate components of a system for modifying an overlay animation for an astronomy experiment, in accordance with implementations of the disclosure.
Figure 8F:
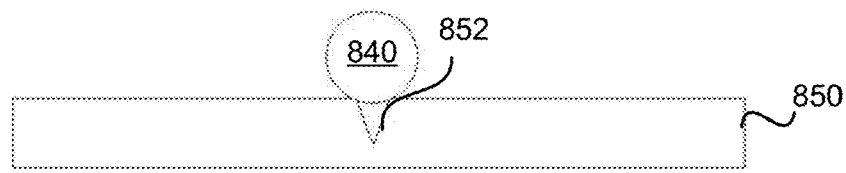
Figure 8G:
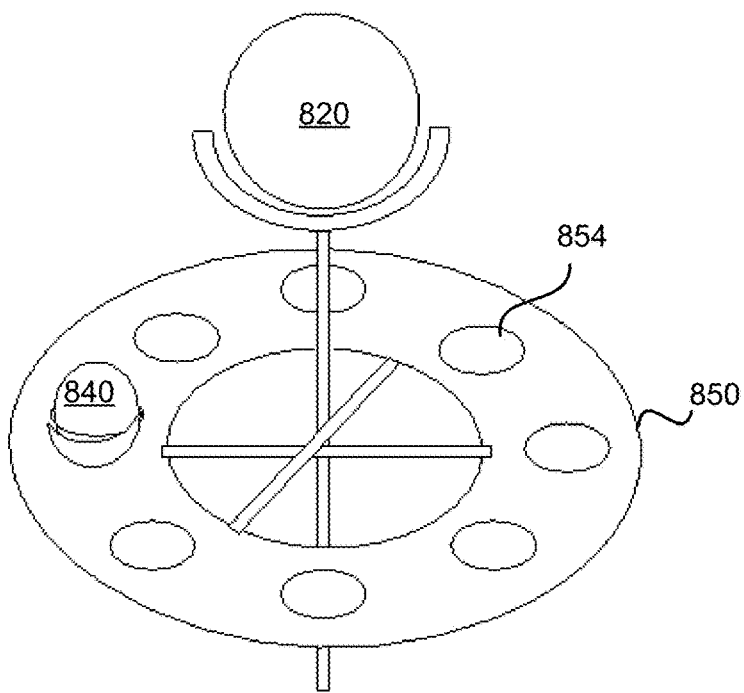

FIGS. 8E-G illustrate components of a system for modifying an overlay animation for an astronomy experiment, in accordance with implementations of the disclosure. FIGS. 8E-8F display the second object 820 coupled to a fourth object 840 and a fifth object 850. In one implementation, the fifth object 850 may be a track for rotating the fourth object 840 around the second object 820. The fifth object may have a groove 852 for rotating the fourth object. The groove 852 may include sensors 100 (e.g., circular resistor) to determine the location of the fourth object 840 in relation to the second object 820.

FIG. 8G displays the second object 820 coupled to a fourth object 840 and a fifth object 850. In one implementation, the fifth object 850 may include indentations 854 (e.g., cavities) for placing the fourth object 840 relative to the second object 820. The indentations 854 may include sensors 100 to determine the location of the fourth object 840 in relation to the second object 820.

FIGS. 9A-G illustrate a system for modifying an overlay animation for a cell experiment, in accordance with implementations of the disclosure. The experimental platform device 130 may include a flat surface 910 and objects 920. The flat surface 910 may be a board (e.g., a rectangular prism), a sphere, a portion of a sphere (e.g., hemisphere), etc. The flat surface 910 may represent a cell. The flat surface 910 may include a microcontroller with Bluetooth®, Wi-Fi®, and/or OTA ability, a capacitive sensor, and/or one or more LEDs (e.g., a string of individually-controlled LEDs).

The flat surface 910 may have indentations 912 (e.g., craters) for receiving one or more objects 920 (e.g., physical representations of organelles such as nucleus, ribosome, mitochondria, etc.). The flat surface 910 may be a sphere with a removable top portion and the indentations may be exposed after removing the top portion. Each indentation 912 may be specific to one object 920. Each indentation 912 may include a sensor 100 (e.g., a capacitance sensor). The computing device 140 may receive an indication that an object 920 has been removed from or has been placed in a respective indentation 912 in flat surface 910. Each indentation 912 may include an LED to indicate that an object 920 has been placed in the indentation 912.

Figure 9B:
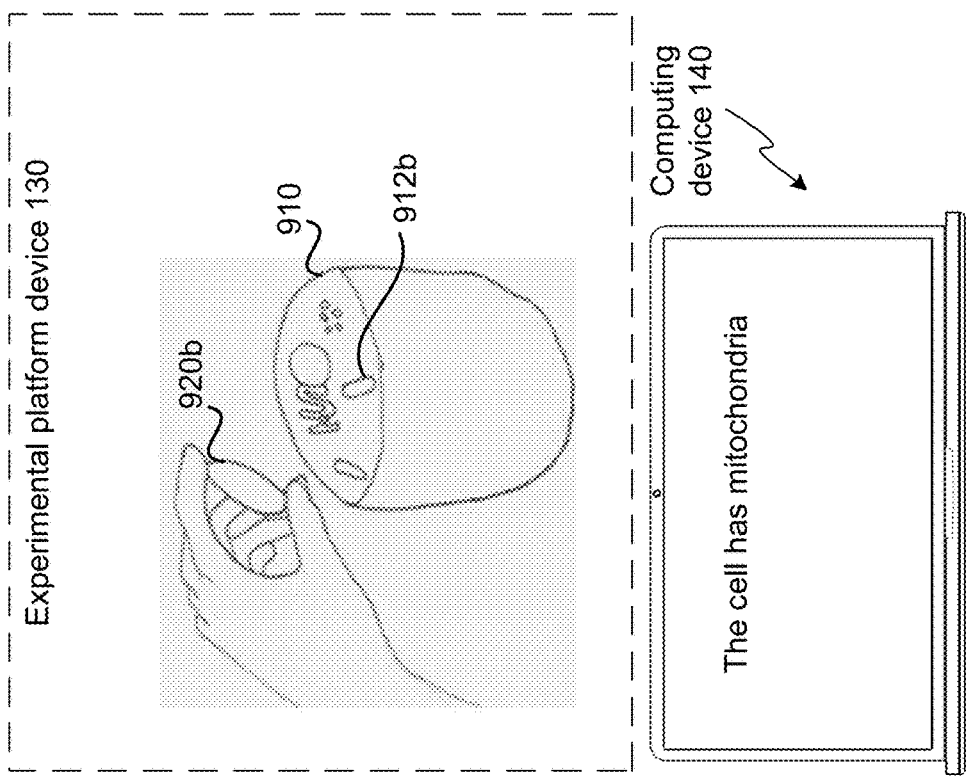
Figure 9A:
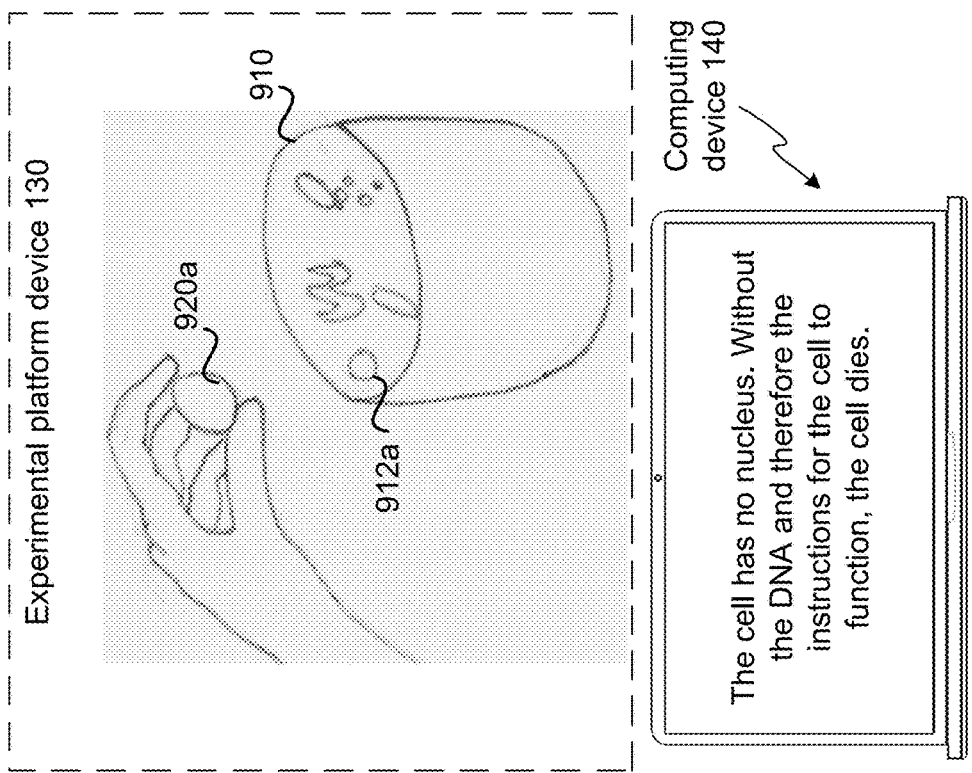

In FIG. 9A, an object 920a may correspond to a sensor 100a in an indentation 912a in flat surface 910. The object 920a may represent a nucleus. Computing device 140 may receive an indication from the experimental platform device 130 that the nucleus has been placed in or removed from the respective indentation 912a in the flat surface 910 (e.g., has engaged with or disengaged with sensor 100a in the respective indentation 912a). For example, in response to removing object 920a, the computing device 140 may display text, an image, and/or an animation indicating that "the cell has no nucleus" and "without the DNA and therefore the instructions for the cell to function, the cell dies." The computing device 140 may superimpose an overlay animation on a video of the experimental platform device 130 representing a living cell. In response to removing the object 920a, the computing device 140 may modify the overlay animation to represent a cell that is dying.

In FIG. 9B, an object 920b may correspond to a sensor 100b in an indentation 912b in flat surface 910. The object 920b may represent mitochondria. Computing device 140 may receive an indication from the experimental platform device 130 that the mitochondria has been placed in or removed from the respective indentation 912b in the flat surface 910 (e.g., has engaged with or disengaged with sensor 100b in the respective indentation 912b). For example, in response to adding object 920b, the computing device 140 may display text, an image, and/or an animation indicating that "the cell has mitochondria."

Figure 9D:
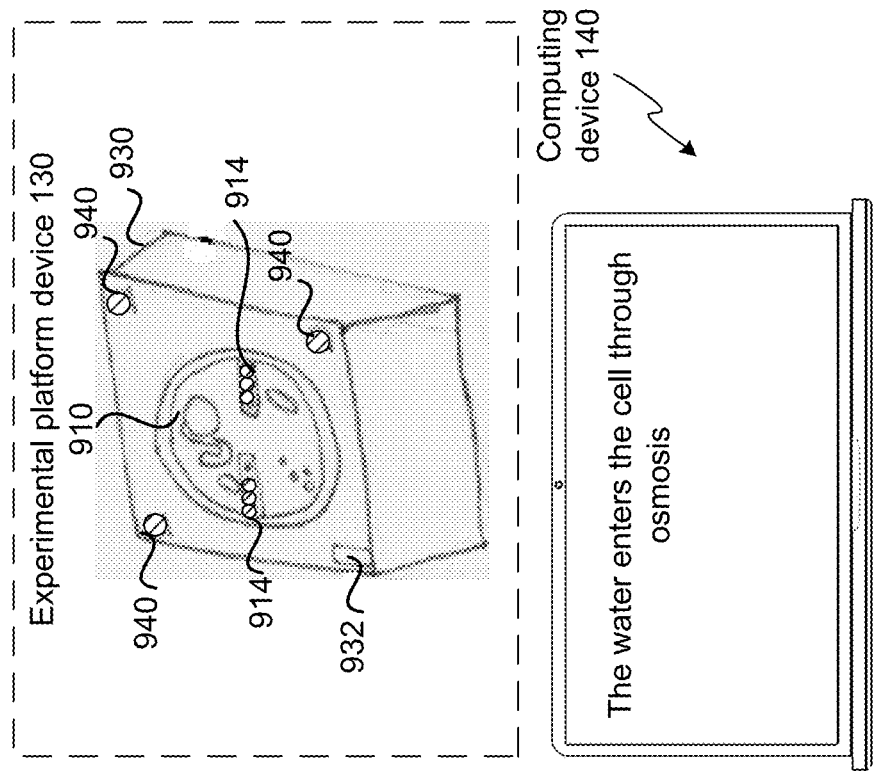
Figure 9C:
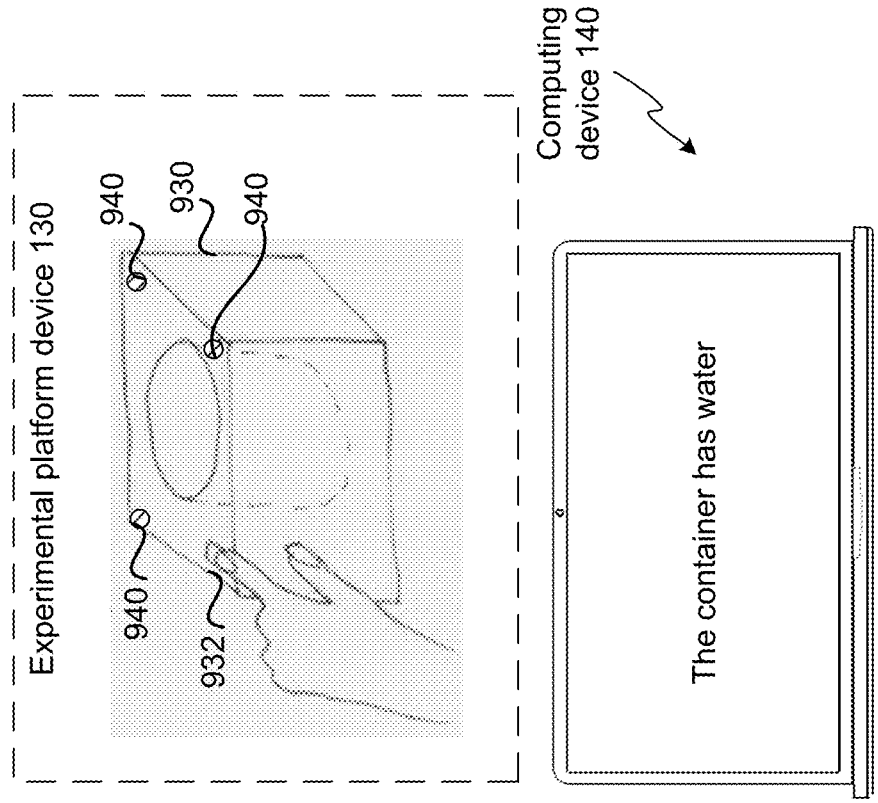

In FIG. 9C, experimental platform device 130 may further include a container 930 representing the environment in which the flat surface 910 (e.g., the cell) is placed. The container 930 may include a microcontroller with Bluetooth®, Wi-Fi®, and/or OTA ability, a sensor 932 (e.g., a capacitive sensor), and one or more display devices 940. The container 930 may receive user input via sensor 932 (e.g., user input of activating a switch, user input selecting a type of solution). Upon receiving user input, the container 930 may activate the one or more display devices 940. For example, the display devices 940 may be light emitting diodes (LEDs) and container 930 cause the LEDs to illuminate in response to receiving user input via sensor 100. The container 930 may cause the LEDs to illuminate a color in response to the user input of a selection of a solution (e.g., red for selection of blood, blue for selection of water, etc.). The computing device 140 may receive an indication that sensor 932 of container 930 was activated. The computing device may display text, an image, and/or an animation indicating that "the container has water."

In FIG. 9D, the flat surface 910 may be disposed in the container 930. Placing the flat surface 910 in the container 930 may be used to teach osmosis. The flat surface 910 may include display devices 914. The flat surface 910 may determine whether the sensor 932 of the container 930 has been activated (e.g., the LEDs of the container 930 have been activated). In response to determining the sensor 100 of the container 930 has been activated, the flat surface 910 may activate the display devices 914 (e.g., illuminate LEDs on the upper surface of the flat surface 910). The illuminated LEDs may represent water entering and/or leaving the cell. The computing device 140 may receive an indication that the flat surface 910 has been placed in the container 930 (e.g., a sensor on the container 930 or flat surface 910 has received input indicating the container 930 and flat surface 910 are in contact) and that the sensor 932 on the container 930 has received user input. The computing device 140 may display text, an image, and/or an animation indicating that "the water enters the cell through osmosis."

Figure 9E:
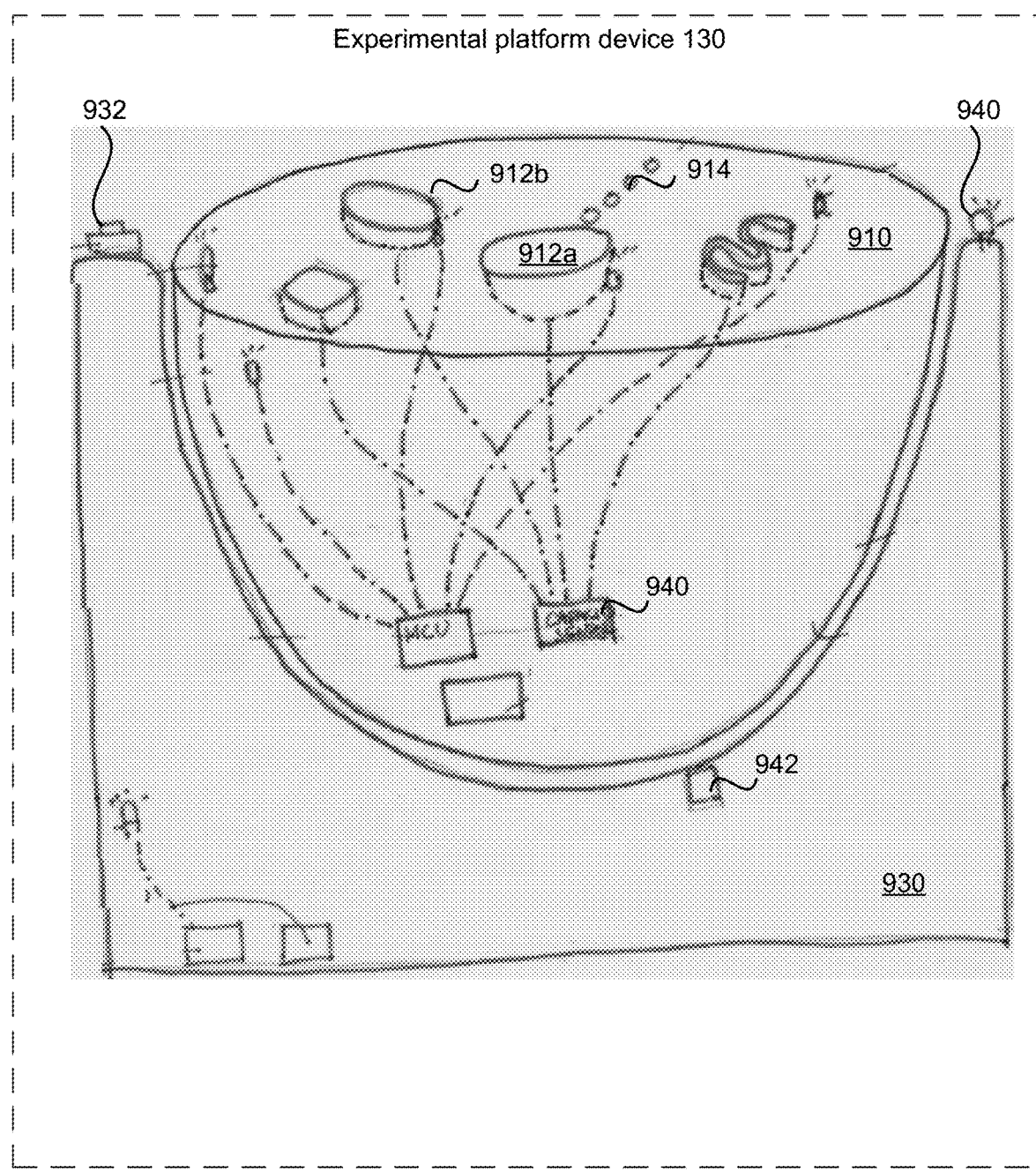
Figure 9E:
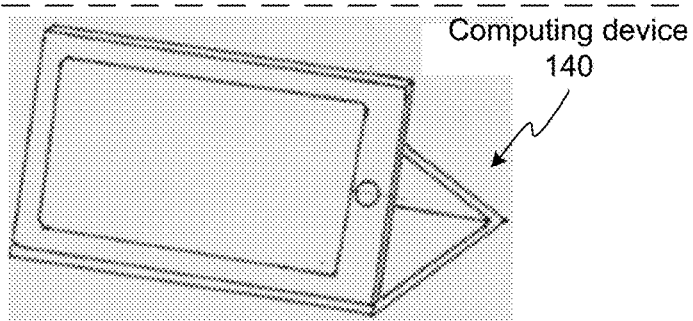

FIG. 9E displays the experimental platform device 130. The experimental platform device 130 may include a flat surface 910 and container 930. The flat surface 910 may include indentations 912 in the flat surface 910 for receiving objects 920, sensors 100 (e.g., capacitance sensors) in the indentations 912, and display devices 914 (e.g., a strip of LEDs). The container 930 may include a sensor 932 to activate display devices 940 in the container 930, a display device 940, and a sensor 942 (e.g., light sensor, capacitance sensor, etc.) to determine the container 930 and the flat surface 910 are in contact. The flat surface 910 may include a power source (e.g., battery) and a processing device (e.g., microcontroller). An upper surface of the flat surface 910 may include a frozen glass material. The LEDs may display a color in response to corresponding user input (e.g., red for a selection of blood, blue for a selection of water, white for a selection of saline water, etc.). The LEDs may illuminate to provide a ripple effect of light (e.g., a visual display that the solution is moving into or out of the cell). The container 930 may include a power source (e.g., battery) and a processing device (e.g., microcontroller).

FIGS. 9F-G illustrate the experimental platform device 130 of FIGS. 9A-E, in accordance with another implementation of the disclosure. In implementations, the flat surface 910 may be integral to the container 930. The flat surface 910 and the container may be integrated in the form of a board (e.g., a two-dimensional shape) and multiple shapes of organelles may be placed on the board to identify different organelles being placed in or taken out of a cell. The position of the organelles may be pre-defined on the board. A cell wall may be predefined on the board. The outside of the cell wall may become the container of the cell and the user may be able to change or manipulate the solution type in the container. Upon change of solution type, the string of LEDs may show the osmosis phenomenon of the solution flowing into or out of the cell. The computing device 140 may modify, in a video of the experimental platform device 130, an overlay animation superimposed on a designated area of the experimental platform device 130 based on independent variable data (e.g., organelles placed in or removed from the cell, whether water is in the container, etc.). As the user places organelles in or removes organelles from the experimental platform device 130, the computing device 140 may modify the overlay animation. For example, the overlay animation may be modified to display a new organelle in the cell in response to placing an organelle in the cell. In another example, the overlay animation may be updated to display that the cell becomes dysfunctional and will not survive in response to removing an organelle from the cell. In another example, the overlay animation may be updated to display the cell becoming full of liquid in response to the container 930 receiving user input to cause osmosis into the cell. In another example, the overlay animation may be updated to display the cell drying up in response to the container 930 receiving user input to cause osmosis out of the cell. The computing device 140 may display how organelles interact with each other, how the organelles move, and the functions of the organelles. The computing device 140 may display arrows to explain osmosis.

FIGS. 10A-D illustrate a system for modifying an overlay animation for an anatomy experiment, in accordance with implementations of the disclosure. The experimental platform device 130 may include a flat surface 1010 with indentations to place components 1020. Each indentation (e.g., crater) may be shaped to engage with a respective component 1020. The flat surface 1010 may be a board or platform and may include one or more of a microcontroller with Bluetooth®, Wi-Fi®, and/or OTA ability, hall effect sensors, a capacitive sensor, a LED, a speaker, a haptic device, a switch to turn on the flat surface 1010, a power source (e.g., battery), etc. The components may include one or more organs, such as esophagus 1020a, intestines 1020b, lungs 1020c, trachea, stomach, etc. The indentations may include a sensor 100 (e.g., capacitive sensor) to determine whether a corresponding component 1020 is placed in or removed from the indentation. Each component 1020 may be coupled to the flat surface 1010 via connectors that resemble the connection between different organs in the body. For example, two lungs may be connected to the trachea, the esophagus may be connected to the stomach, etc. The connections may be made via a wire connector (e.g., functioning as a switch that identifies to the processing device that a connection has been made when the switch is closed). The connections may be made for different functions of human anatomy (e.g., breathing, food processing, blood circulation, etc.).

Figure 10B:
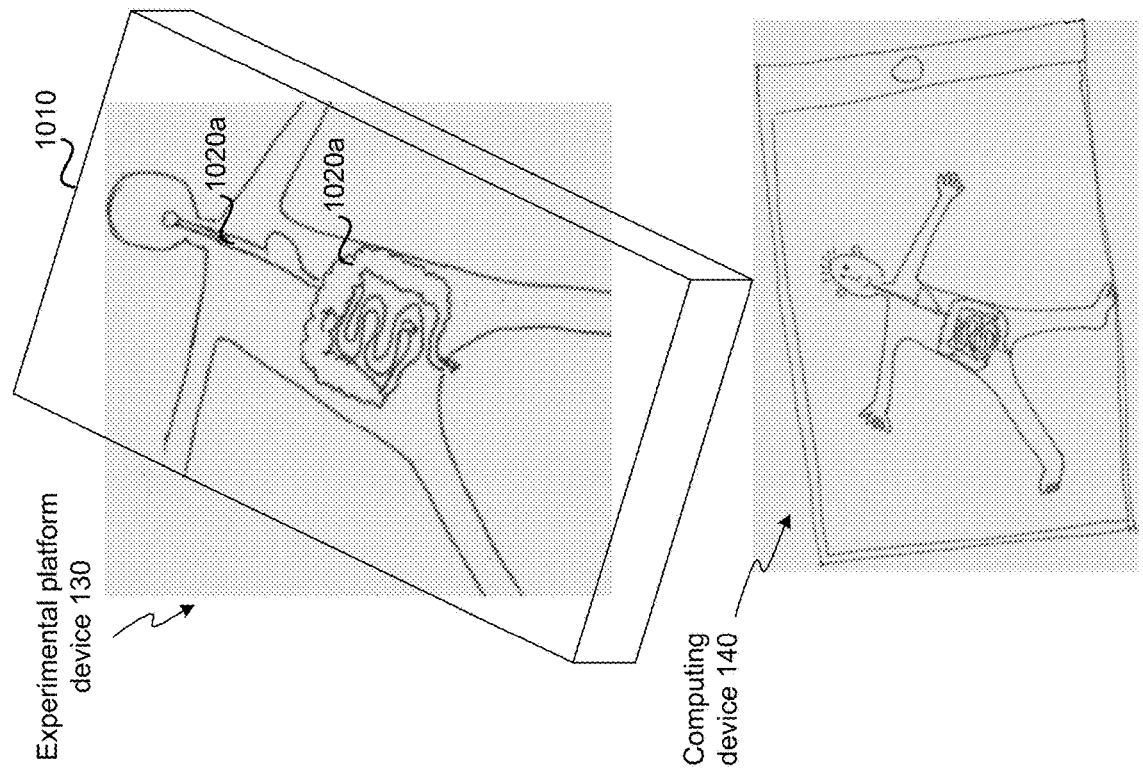
Figure 10A:
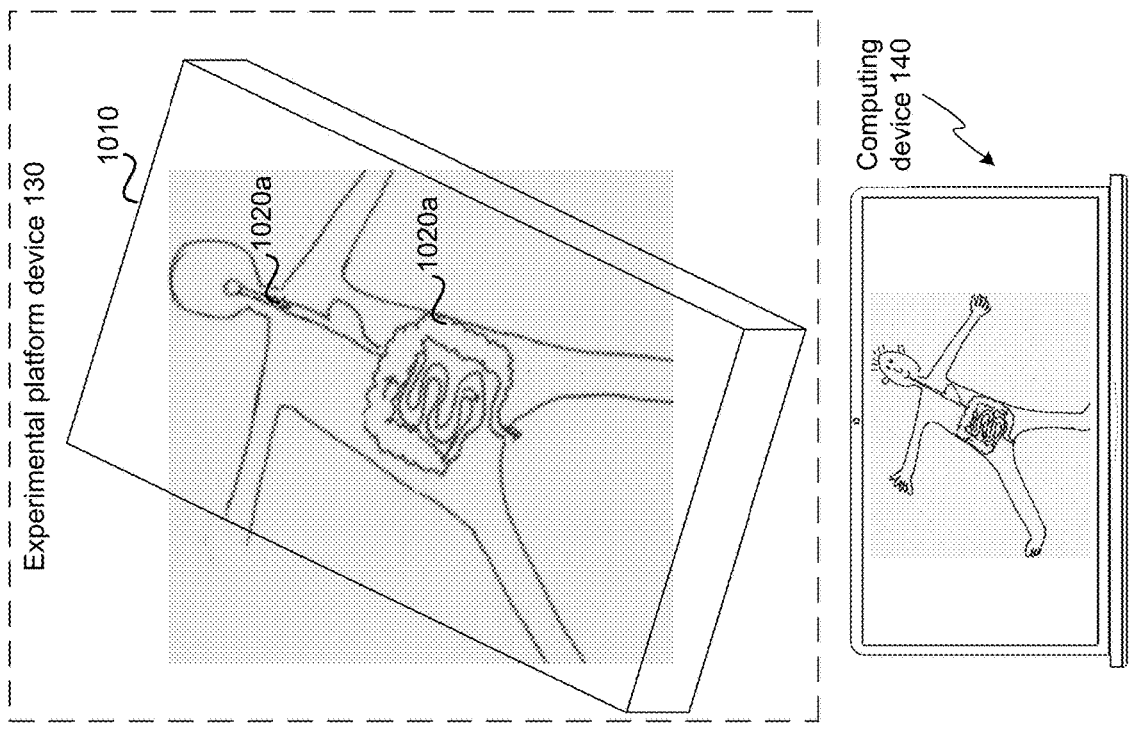

The computing device 140 may modify, in a video of the experimental platform device 130, an overlay animation superimposed on a designated area of the experimental platform device 130 based on independent variable data (e.g., organs placed in the body, lungs and diaphragm expanding and contracting, food traveling from mouth to stomach for digesting and intestines for absorbing nutrients and then to excretion from body, etc.). In one implementation, the anatomy experiment will show human digestion system (FIGS. 10A-B). In another implementation, the anatomy experiment will show human respiration system (FIGS. 10C-D). The overlay animation may be modified to show a function of the human body (e.g., food processing, blood circulation) in response to corresponding components 1020 being placed on the flat surface 1010 and may be modified to show the function not working (e.g., food falling out, blood coming out) in response to the corresponding components 1020 not being placed on the flat surface 1010.

Figure 11B:
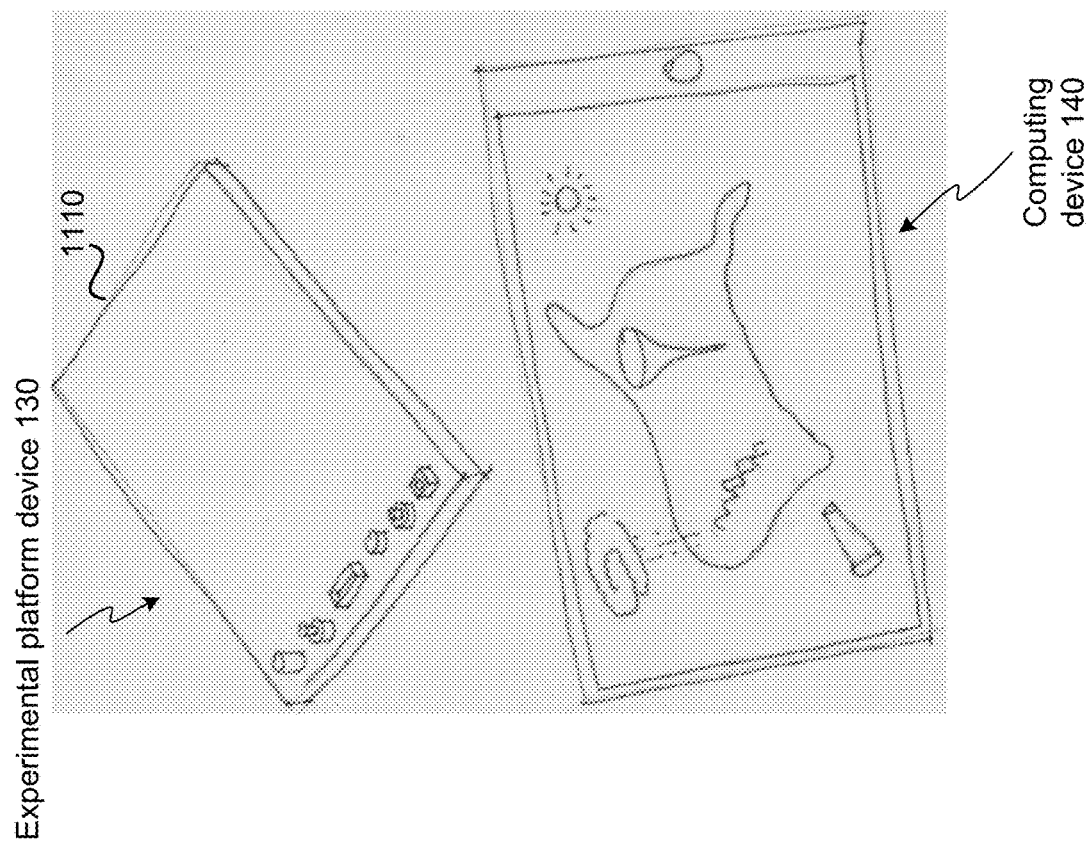
FIGS. 11A-B illustrate a system for modifying an overlay animation for a weather experiment, in accordance with implementations of the disclosure.
Figure 11A:
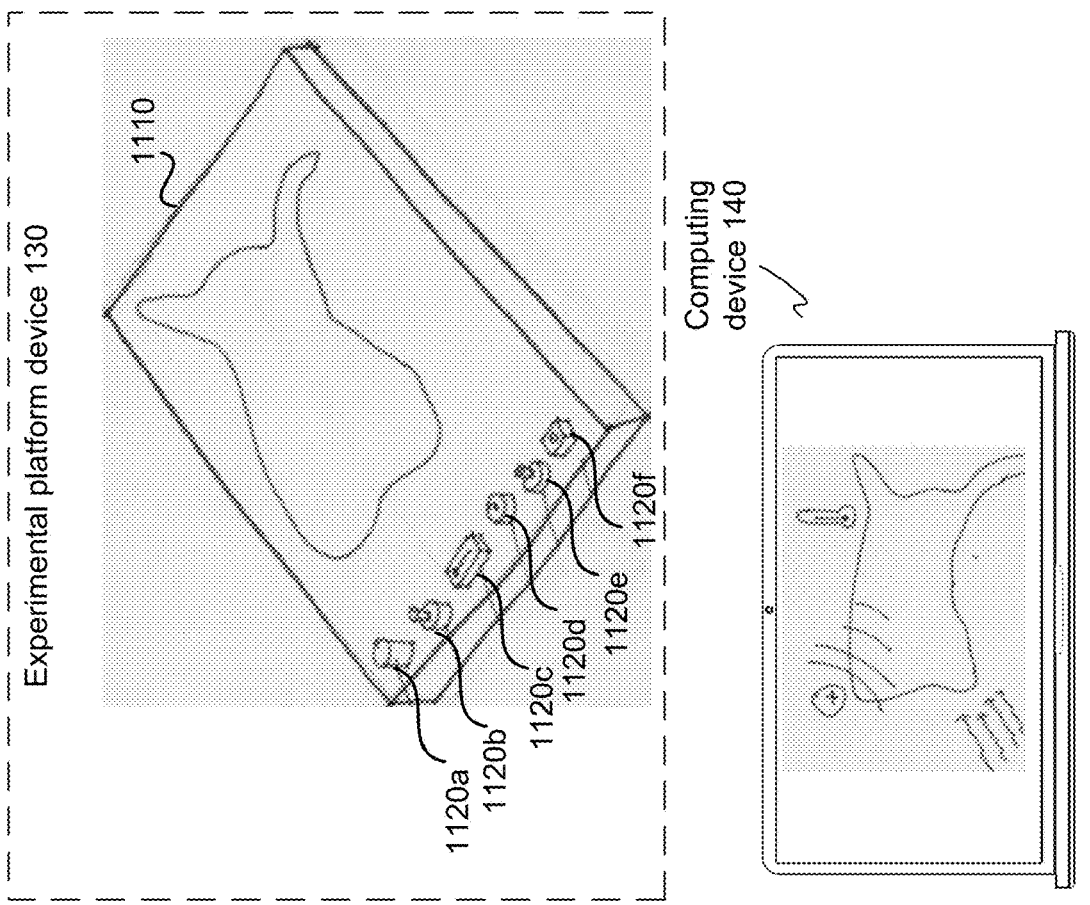

FIGS. 11A-B illustrate a system for modifying an overlay animation for a weather experiment, in accordance with implementations of the disclosure. The experimental platform device 130 includes a flat surface 1110 that includes one or more 1120 input devices. For example, the 1120 input devices may include one or more of a barometer input device 1120a (e.g., pressure sensor), a wind wane input device 1120b (e.g., a knob, a potentiometer), a temperature input device 1120c (e.g., a slider), a wind direction input device 1120d (e.g., a click button including an arrow position that can be rotated), humidity input device 1120e (e.g., a knob, a potentiometer), or a start input device 1120f (e.g., to indicate the independent variables have been set, to start the experiment, and to display the weather impact on the computing device 140). The computing device 140 receives independent variable data input via the input devices 1120 from the experimental platform device 130. The computing device 140 may modify, in a video of the experimental platform device 130, an overlay animation superimposed on a designated area of the experimental platform device 130 based on independent variable data (e.g., temperature, pressure, wind, humidity, etc.). For example, the computing device 140 may display an overlay animation that a portion of a geographical area may have rain, wind, high temperatures, etc.

Figure 12B:
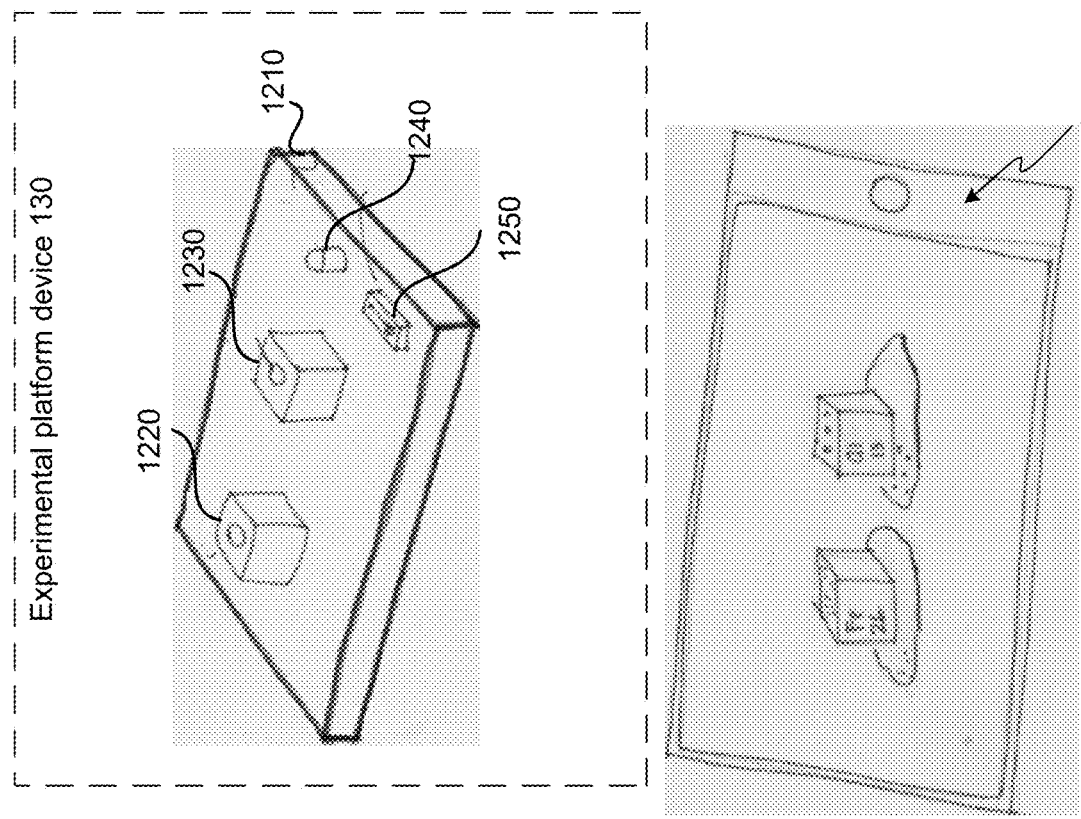
FIGS. 12A-B illustrate a system for modifying an overlay animation for a matter experiment, in accordance with implementations of the disclosure.
Figure 12A:
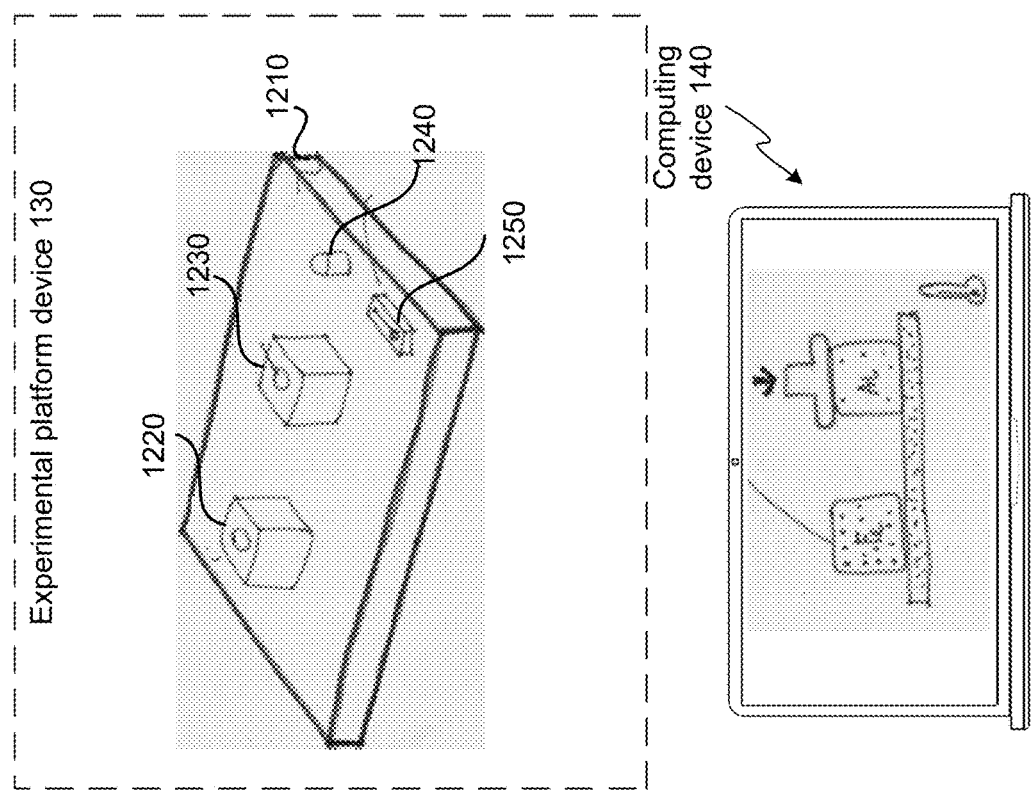

FIGS. 12A-B illustrate a system for modifying an overlay animation for a matter experiment, in accordance with implementations of the disclosure. The experiment may display changes in matter in response to temperature or pressure change. The experimental platform device 130 may include one or more of a flat surface 1210, a first object 1220 (e.g., a first cube), a second object 1230 (e.g., a second cube), a pressure control 1240 (e.g., pressure sensor), or a temperature control 1250 (e.g., a slider). The first object 1220 and the second object 1230 may each include one or more of a touch sensor (e.g., to select the type of matter, such as wood, iron, aluminum, water, ice, etc.), a LED, or a haptic device to provide haptic feedback. The user may apply a force to the first object 1220 or the second object 1230 via a push button. A haptic device may cause the flat surface 1210 to vibrate as the temperature, pressure, and/or force applied are modified. A LED may change in brightness and/or color (e.g., to give feedback of a physical or chemical reaction) as the first object 1220 and/or second object 1230 experiences a physical change in response to a change in temperature, pressure, and/or force.

The computing device 140 may receive information from the experimental platform device 130 including user input via one or more the first object 1220, the second object 1230, the pressure control 1240, or the temperature control 1250 (e.g., a slider control). The computing device 140 may receive user input of an element via the experimental platform device 130 or via a GUI displayed on the computing device 140. In one implementation, the flat surface 1210 may be transparent and may include a sensor (e.g., a color sensor, an RFID sensor, etc.) to determine a property (e.g., the color, an RFID tag) of the first object 1220 and/or the second object 1230 that is placed on the flat surface 1210. In another implementation, a push button switch will be used to select the type of substrate (e.g., through the action of pushing the button multiple times to go through the choices).

The computing device 140 may modify, in a video of the experimental platform device 130, an overlay animation superimposed on a designated area of the experimental platform device 130 based on independent variable data (e.g., a chemical or physical reaction, selecting of element, pressure, temperature, etc.). The computing device may display how particles from different elements move differently after heat is applied and/or after pressure is applied (e.g., wood may be burned in response to increase in temperature, water may be evaporated in response to an increase in temperature, water may become ice in response to a decrease in temperature, iron may glow to an orange color when it reaches a temperature and then it melts, etc.). The computing device 140 may cause the experimental platform device 130 to provide visual feedback via the LEDs, provide haptic feedback via the haptic device, etc.

Figures 13A, 13B:
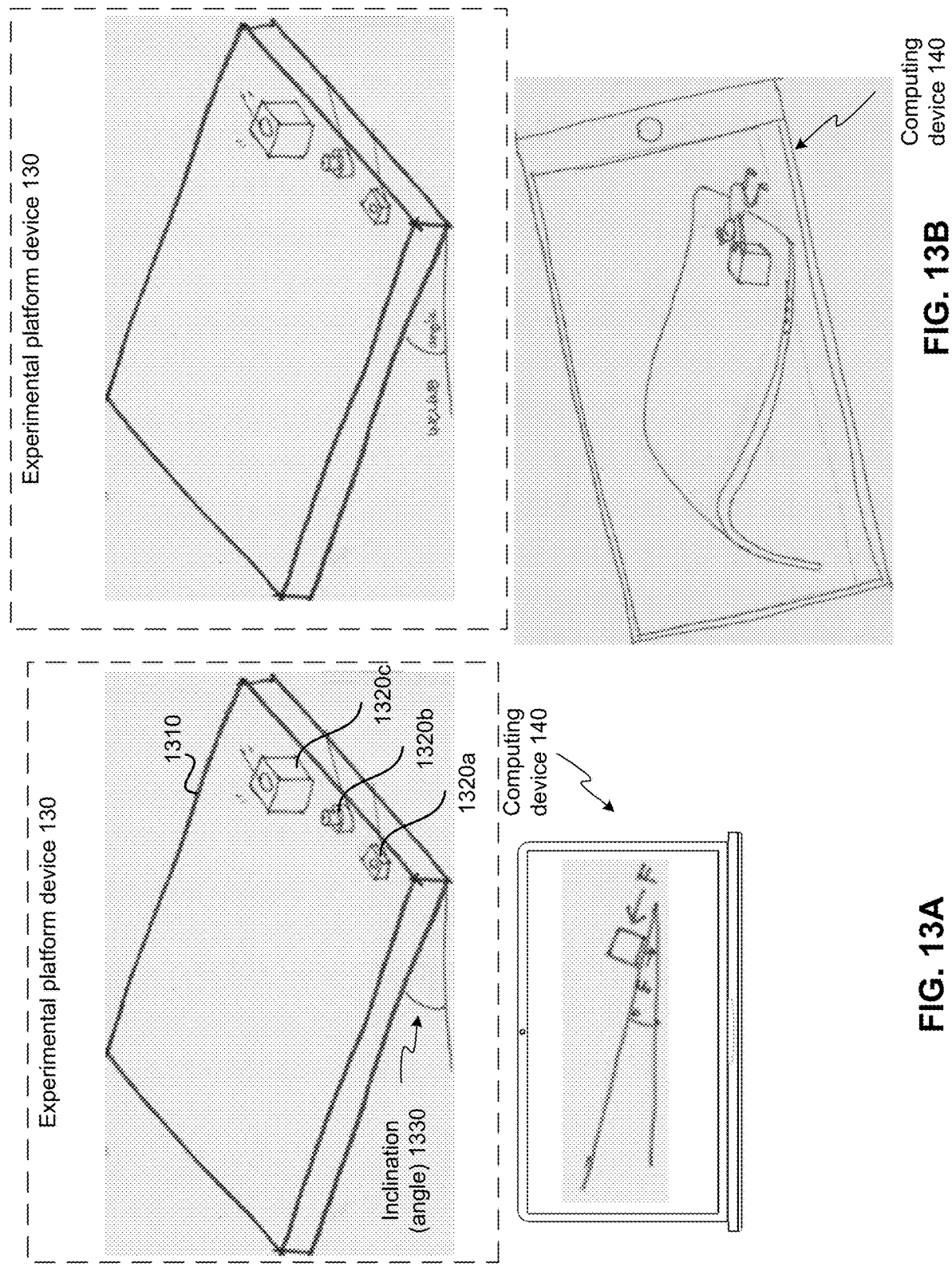
FIGS. 13A-B illustrate a system for modifying an overlay animation for a force and motion experiment, in accordance with implementations of the disclosure.

FIGS. 13A-B illustrate a system for modifying an overlay animation for a force and motion experiment, in accordance with implementations of the disclosure. The experimental platform device 130 may include one or more of a flat surface 1310, a first user input device 1320a, a second user input device 1320b, and a third user input device 1320c. The flat surface 1310 may include a gyroscope to determine the inclination 1330 of the flat surface 1310. The first user input device 1320a may be a push button to indicate a force. The second user input device 1320b may be a knob or potentiometer to indicate friction. The third user input device 1320c may include one or more of a touch sensor (e.g., to select the type of object, such as a human on a skateboard, a car, a heavy truck, etc.) or a haptic device. In one implementation, the third user input device 1320c is integral to the flat surface 1310. In another implementation, the third user input device 1320c is external to the flat surface 1310. The computer device 140 may receive information from experimental platform device 130 (e.g., the flat surface 1310 and/or the third user input device 1320c) and display the forces and friction that are working on the third user input device 1320c. The computing device 140 may modify, in a video of the experimental platform device 130, an overlay animation superimposed on a designated area of the experimental platform device 130 based on independent variable data (e.g., the force, the friction, the inclination 1330, etc.). For example, the overlay animation may be a graphical representation of a person pushing an object on a surface up an incline. In response to changing the force, the computing device 140 may modify the graphical representation of a person (e.g., a child pushing the object, a muscular adult pushing the object). In response to changing the friction, the computing device 140 may modify the type of surface (e.g., ice, dirt road or gravel, etc.). In response to changing the inclination 1330, the computing device 140 may modify the inclination 1330 of the surface. In response to the indication of force and friction, the computing device 140 may display the object moving or staying stationary. The computing device 140 may display how friction and forces interact in response to receiving updated independent variable data.

Figures 14A, 14B:
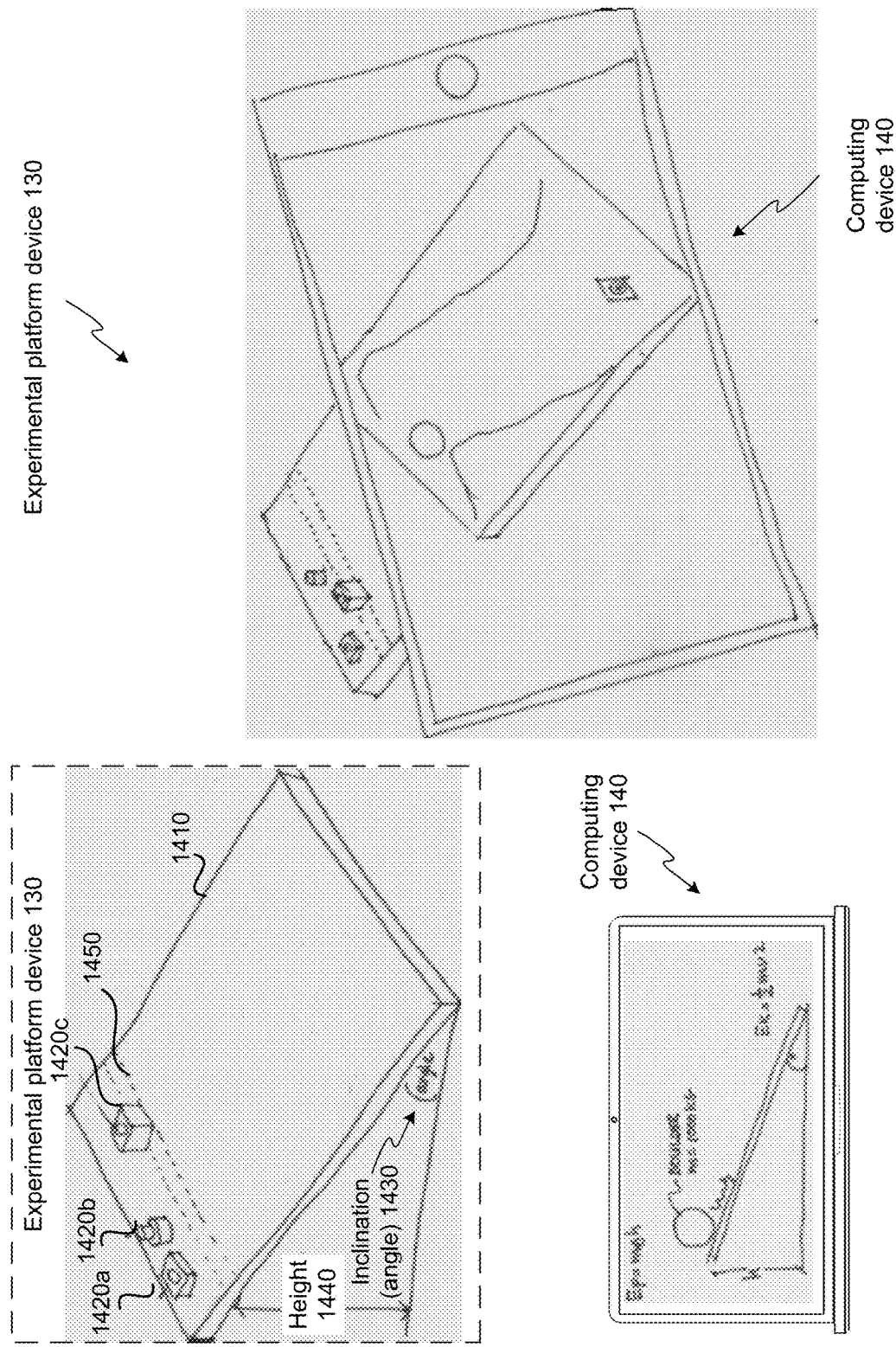
FIGS. 14A-B illustrate a system for modifying an overlay animation for a kinetic and potential energy experiment, in accordance with implementations of the disclosure.

FIGS. 14A-B illustrate a system for modifying an overlay animation for a potential and kinetic energy experiment, in accordance with implementations of the disclosure. The experimental platform device 130 may include one or more of a flat surface 1410, a first user input device 1420a, a second user input device 1420b, and a third user input device 1420c. The flat surface 1410 may include a gyroscope to determine the inclination 1430 and/or height 1440 of the flat surface 1410. The first user input device 1420a may be a push button to indicate a mass or a force. The second user input device 1420b may be a knob to indicate friction (e.g., the experimental platform device 130 may not include a second user input device 1420b). The third user input device 1420c may include one or more of a touch sensor (e.g., to receive user input such of a selection of an object, such as a boulder, a human on a skateboard, a car, a truck, etc.) or a LED. In one implementation, the third user input device 1420c is integral to the flat surface 1410. In another implementation, the third user input device 1420c is external to the flat surface 1410. The flat surface 1410 may include a magnetic strip 1450. The magnetic strip 1450 may secure a third user input device 1420c (e.g., that is external to the flat surface 1410) to the flat surface 1410 regardless of the inclination 1430 of the flat surface 1410.

The computer device 140 may receive information from experimental platform device 130 (e.g., the flat surface 1410 and/or the third user input device 1420c) and display the potential and kinetic energy of the third user input device 1420c. For example, the potential energy ($E_p$) may be illustrated as being the mass (m) of the graphical representation of the third user input device 1420c multiplied by a gravity constant (g) and the height (h) 1440 (e.g., $E_p = m*g*h$). The kinetic energy ($E_k$) may be illustrated as being half of the mass (m) of the graphical representation of the third user input device 1420c multiplied by the velocity (v) squared (e.g., $E_k = (\frac{1}{2})*m*v^2$). The computing device 140 may display that the original potential energy is converted into kinetic energy which determines how far the object will move once it reaches the bottom of the inclination. The computing device 140 may display an animation of the object sliding or rolling down the inclination, moving across a flat surface at the bottom of the inclination (e.g., due to the kinetic energy), and hitting a target.

The computing device 140 may modify, in a video of the experimental platform device 130, an overlay animation superimposed on a designated area of the experimental platform device 130 based on independent variable data (e.g., the mass, the height 1440, friction, the inclination 1430, etc.). For example, the overlay animation may be a graphical representation of a boulder on a surface up an incline. In response to changing the mass, the computing device 140 may modify the indication of the potential and kinetic energies of the boulder. In response to changing the height 1440 or inclination 1430, the computing device 140 may modify the height 1440 or inclination 1430 of the surface and modify the indication of the potential and kinetic energies of the boulder. The computing device 140 may display how potential and kinetic energy interact in response to receiving updated independent variable data.

In one implementation, in response to receiving user input via the third user input device 1420c (e.g., via a start button), the computing device 140 may start the potential and kinetic energy experiment. In one implementation, the computing device 140 may display a GUI element (e.g., a start button) and upon user input of selecting the GUI element, the computing device 140 may initiate the potential and kinetic energy experiment.

Figure 15B:
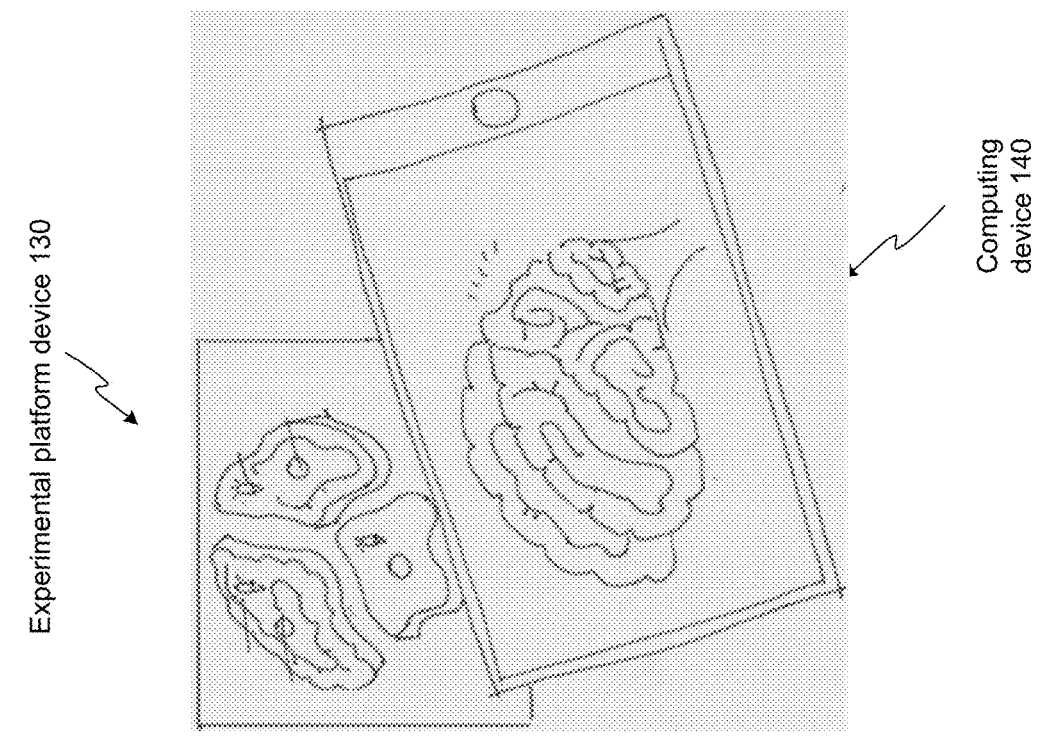
FIGS. 15A-B illustrate a system for modifying an overlay animation for a brain experiment, in accordance with implementations of the disclosure.
Figure 15A:
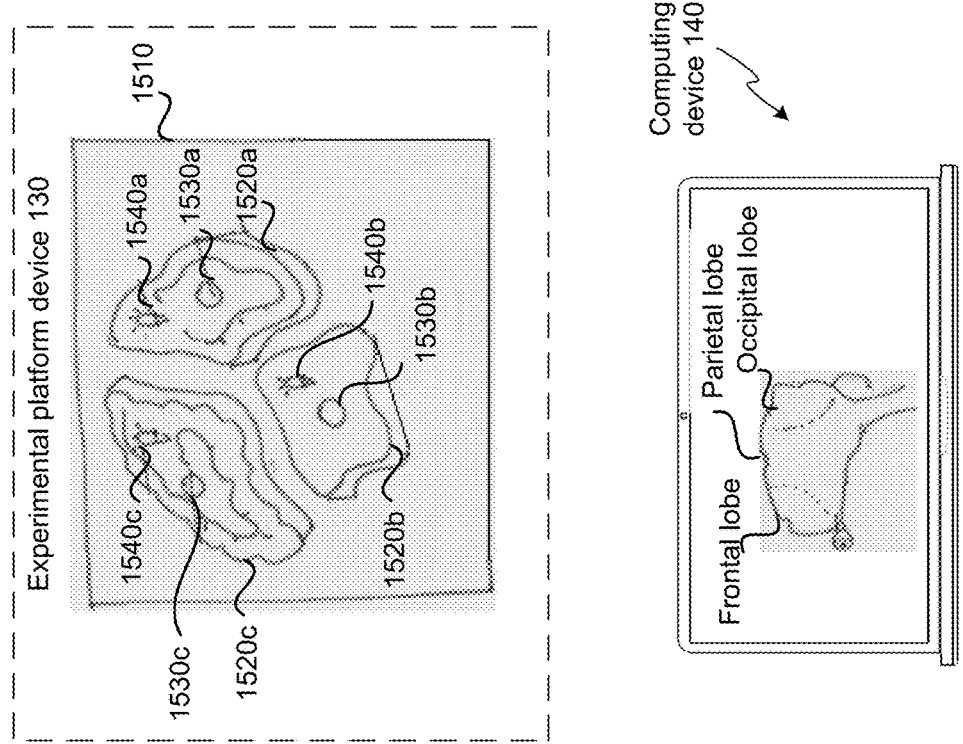

In one implementation, upon initiating the potential and kinetic energy experiment, the computing device 140 may modify the overlay animation to display a graphical representation of the third user input device 1420c sliding down the inclination and may display updated potential and kinetic energy values for the graphical representation as the graphical representation slides down the inclination. In one implementation, the magnetic strip 1450 may exert a magnetic field in response to electric current flowing through the magnetic strip 1450 (e.g., the magnetic strip 1450 is an electromagnetic). In response to initiating the potential and kinetic energy experiment, the experimental platform device 130 may stop electric current from flowing through the magnetic strip 1450. In response to stopping the electric current, the third user input device 1420c may slide down the flat surface 1410. FIGS. 15A-B illustrate a system for modifying an overlay animation for a brain experiment, in accordance with implementations of the disclosure. The experimental platform device 130 may include one or more of a flat surface 1510 (e.g., a board, a three-dimensional object, etc.), brain sections 1520 (e.g., removable components or drawings for the position of different parts of the brain, such as cerebellum, cerebral cortex, thalamus, frontal lobe, parietal lobe, occipital lobe, etc.), sensors 1530 (e.g., capacitance touch sensors), and LEDs 1540. In response to receiving user input via a sensor 1530 (e.g., a user touching the respective brain section 1520), the experimental platform device 130 may turn on the respective LED 1540. In response to receiving user input of an activity (e.g., seeing, hearing, touching, smelling, tasting, movement, emotions, communicating, remembering, thinking, etc.) via an input device on the experimental platform device 130, the computing device 140 may indicate (e.g., by illuminating or changing the color of the portion of the brain via an overlay animation, by causing LED of a brain section 1520 to illuminate) which brain section 1520 is involved in that activity. In response to selecting a brain section 1520, the computing device 140 may display functionality of that portion of the brain.

The computer device 140 may receive information from experimental platform device 130 (e.g., the flat surface 1510) and display an image of the brain with the corresponding brain section 1520 illuminated. The computing device 140 may modify, in a video of the experimental platform device 130, an overlay animation superimposed on a designated area of the experimental platform device 130 based on independent variable data (e.g., selection of a different brain section 1520).

Figure 16B:
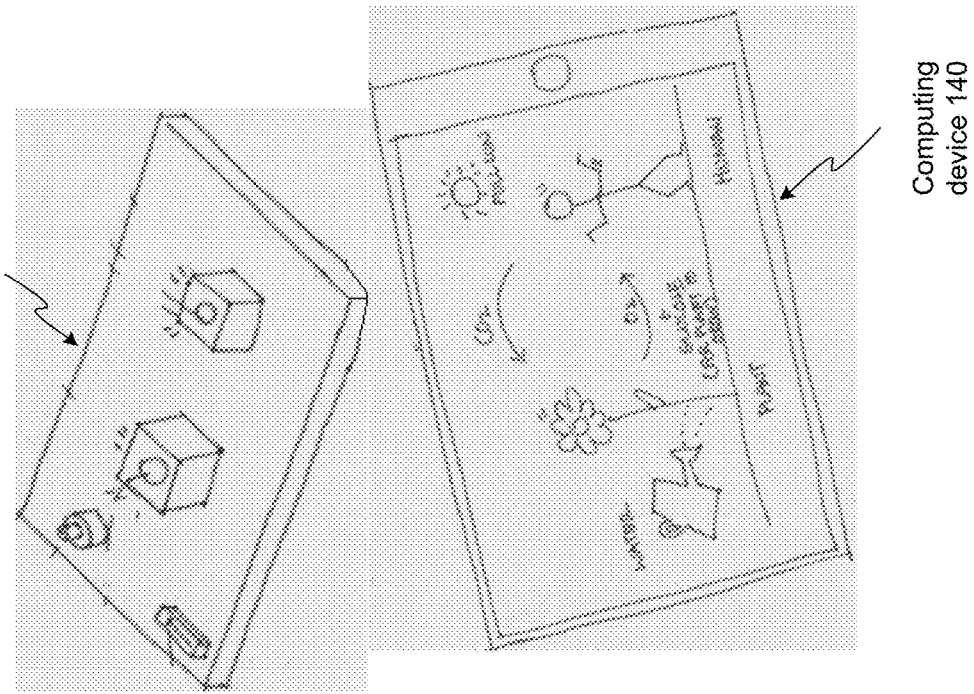
FIGS. 16A-B illustrate a system for modifying an overlay animation for a photosynthesis and respiration experiment, in accordance with implementations of the disclosure.
Figure 16A:
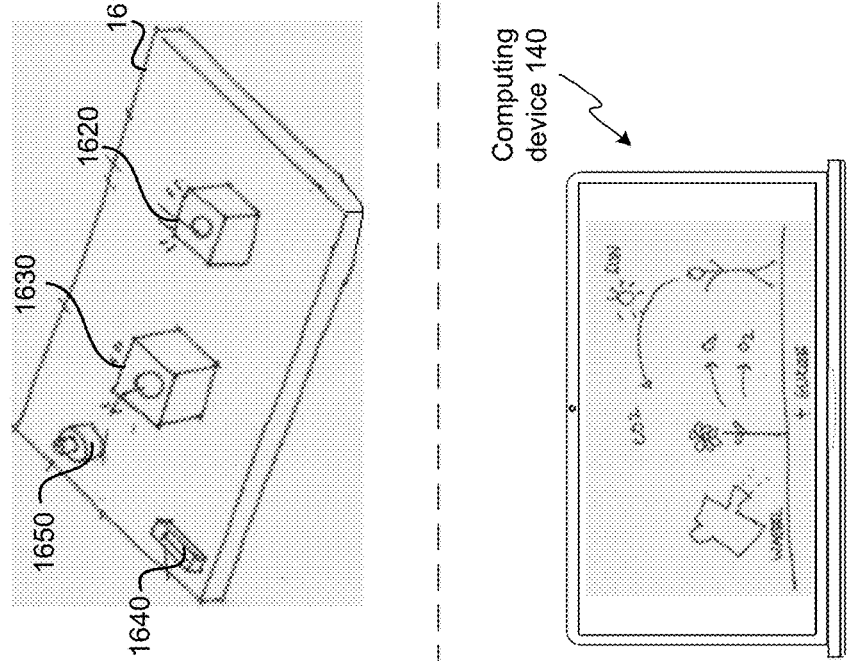

FIGS. 16A-B illustrate a system for modifying an overlay animation for a photosynthesis and respiration experiment, in accordance with implementations of the disclosure. The experiment may represent the plant and human ecosystem. The experimental platform device 130 may include one or more of a flat surface 1610, a first user input device 1620, a second user input device 1630, a third user input device 1640, a fourth user input device 1650. The first user input device 1620 may represent a plant and may include a one or more of a touch sensor and a LED. The second user input device 1630 may represent a human and may include a one or more of a touch sensor and a LED. In one implementation, the first user input device 1620 and the second user input device 1630 are integrated into the flat surface 1610. In another implementation, the first user input device 1620 and the second user input device 1630 are external to the flat surface 1610 (e.g., separate objects, cubes to be placed on the flat surface 1610). The third user input device 1640 (e.g., slider) may receive user input to indicate a temperature for the experiment (e.g., a thermometer, a representation of sunlight). The fourth user input device 1650 may be a knob (e.g., potentiometer) for selecting an amount of water for the experiment.

The computer device 140 may receive information from experimental platform device 130 (e.g., the flat surface 1610, first user input device 1620, second user input device 1630, etc.) and display a graphical representation of a plant (e.g., overlaid on first user input device 1620), a human (e.g., overlaid on second user input device 1630), an amount of water, and an amount of sun. The graphical representation may also display carbon dioxide ($CO_2$) output by the human (e.g., and received by the plant) and oxygen ($O_2$) output by the plant (e.g., and received by the human). The computing device 140 may modify, in a video of the experimental platform device 130, an overlay animation superimposed on a designated area of the experimental platform device 130 based on independent variable data (e.g., change in sunlight, change in amount of water, change in location of the plant or human, etc.). In one implementation, the computing device 140 may display a change in production of oxygen and glucose in response to change in sunlight and water.

In response to the computing device 140 displaying the graphical representation of first user input device 1620 (e.g., plant) emitting $O_2$, (e.g., production of oxygen) the computing device 140 may cause the LED of the first user input device 1620 to be illuminated. In response to the computing device 140 displaying the graphical representation of second user input device 1630 (e.g., human) emitting $CO_2$ (production of $CO_2$), the computing device 140 may cause the LED of the second user input device 1630 to be illuminated. The LED brightness may change as the quantity of plants and/or humans increases (e.g., additional first user input devices 1620 and/or 1630 are placed on the flat surface 1610).

Figure 17A:
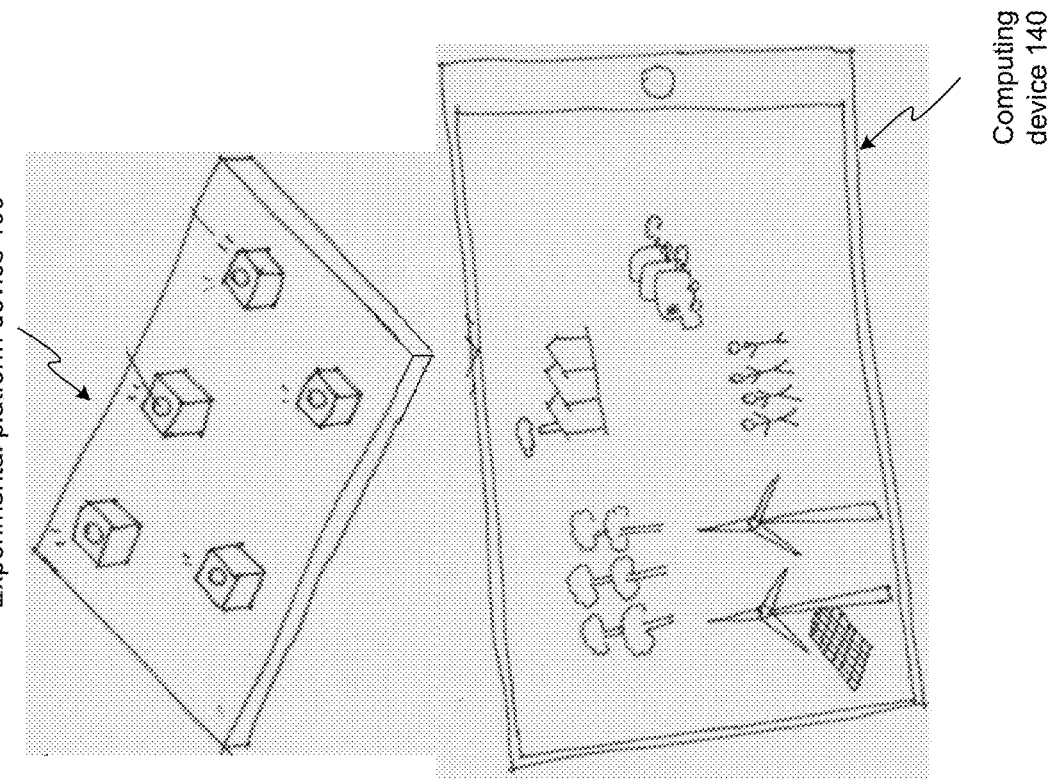
FIGS. 17A-B illustrate a system for modifying an overlay animation for a climate change experiment, in accordance with implementations of the disclosure.
Figure 17B:
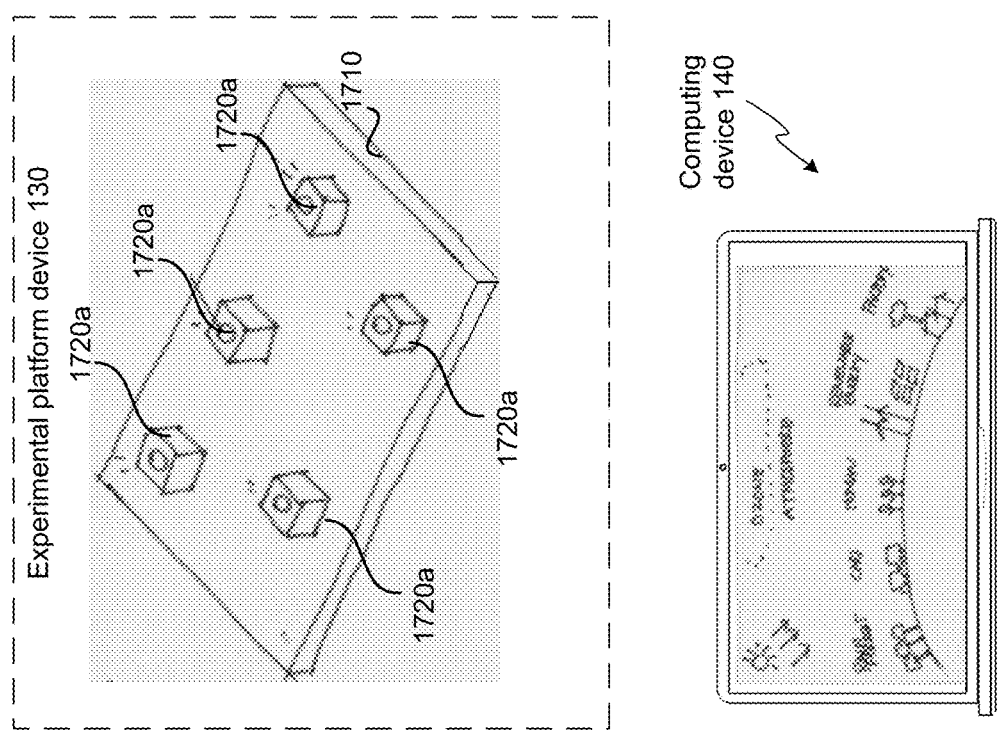

FIGS. 17A-B illustrate a system for modifying an overlay animation for a climate change experiment, in accordance with implementations of the disclosure. The experimental platform device 130 may include one or more of a flat surface 1710 and user input devices 1720. The flat surface 1710 may have different sections corresponding to different activities (e.g., polluting activities, renewable activities). The user input devices 1720 may include one or more of a touch sensor and a LED. In one implementation, the user input devices 1720 are integrated into the flat surface 1710 (e.g., one user input device 1720 per section corresponding to a polluting or renewable activity). In another implementation, the user input devices 1720 are external to the flat surface 1710 (e.g., separate objects, cubes to be placed on sections corresponding to polluting or renewable activities). The experimental platform device 130 may receive user input via the respective touch sensors of one or more of the user input devices 1720 (e.g., to increase the amount of an activity).

The computer device 140 may receive information from experimental platform device 130 (e.g., the flat surface 1710, user input devices 1720, etc.) and display a graphical representation of an environment (e.g., sun, ozone, atmosphere, forests, etc.), polluting activities (e.g., gasoline-based cars, humans, factories, etc.), and renewable activities (e.g., windmills, solar panels, etc.). The computing device 140 may modify, in a video of the experimental platform device 130, an overlay animation superimposed on a designated area of the experimental platform device 130 (e.g., a wind turbine overlaid on a user input device 1720, etc.) based on independent variable data (e.g., number of polluting activities, number of renewable activities, etc.). For example, the computing device 140 may display improved environmental factors (e.g., less ozone depletion) in response to the independent variable data indicating more renewable activities than polluting activities. In another example, the computing device 140 may display worsened environmental factors (e.g., more ozone depletion) in response to the independent variable data indicating less renewable activities than polluting activities. The computing device 140 or experimental platform device may cause the LED in each of the user input devices 1720 to be brighter as the quantity of polluting activities increases. In response to receiving user input via a user input device 1720, the computing device 140 may increase the quantity of the corresponding graphical representation (e.g., a rainforest) displayed on the computing device 140. The computing device 140 may display the overall impact on the climate change (e.g., increased rainforest decreasing climate change).

As the previous multiple implementations showed, the present disclosure can be used with variety of lessons, which will be apparent to those skilled in the art, and can be made in similar method and apparatus disclosed herein without departing from the spirit and scope defined.

What is claimed is:

1. A method comprising:
  capturing, by a camera coupled to a computing device, a video of an experimental platform device having a designated area for an experiment, wherein a first physical object comprising a sensor is external to the experimental platform device, and wherein the experimental platform device and the first physical object are remote from the camera and the computing device;

displaying, by the computing device, the video of the experimental platform device;

superimposing, in the video, an overlay animation on the designated area of the experimental platform device, the overlay animation corresponding to an environment of the experiment;

receiving, by the computing device, first independent variable data from the experimental platform device and second independent variable data from the first physical object, wherein the second independent variable data corresponds to user input comprising manipulations of the sensor of the first physical object by a user; and modifying, in the video, the overlay animation superimposed on the designated area based on the first independent variable data and the second independent variable data.

2. The method of claim 1, wherein the computing device is a tablet and the camera is integral to the computing device, wherein the displaying is via a display of the tablet.

3. The method of claim 1, wherein the second independent variable data is sensor data and the sensor is one or more of a gyroscope, an accelerometer, or a touch capacitance sensor.

4. The method of claim 1, wherein the sensor is a switch and the second independent variable data is a state of the switch.

5. The method of claim 1, wherein the experimental platform device comprises a second sensor, wherein the first independent data corresponds to second user input comprising second manipulations of the second sensor of the experimental platform device by the user.

6. The method of claim 1, wherein the sensor of the first physical object comprises an actuator.

7. The method of claim 1, wherein a second physical object comprises a third sensor and is external to the first physical object and the experimental platform device, wherein the method further comprises receiving third independent variable data from the second physical object, and wherein the modifying of the overlay animation is further based on the third independent variable data.

8. The method of claim 5, wherein the experimental platform device is a liquid stream table, the second sensor comprises a gyroscope sensor, the first independent variable data indicates an inclination of the liquid stream table, and the overlay animation comprises an erosion animation based on the inclination.

9. A non-transitory computer readable storage medium comprising instructions that, when executed by a processing device, cause the processing device to perform operations comprising:

receiving, from a camera coupled to the processing device, a video of an experimental platform device having a designated area for an experiment, wherein a first physical object comprising a sensor is external to the experimental platform device, and wherein the experimental platform device and the first physical object are remote from the camera and the processing device;

causing a display device coupled to the processing device to display the video of the experimental platform device;

superimposing, in the video, an overlay animation on the designated area of the experimental platform device, the overlay animation corresponding to an environment of the experiment;

receiving, from the experimental platform device, first independent variable data from the experimental platform device and second independent variable data from the first physical object, wherein the second independent variable data corresponds to user input comprising manipulations of the sensor of the first physical object by a user; and modifying, in the video, the overlay animation superimposed on the designated area based on the first independent variable data and the second independent variable data.

10. The non-transitory computer readable storage medium of claim 9, wherein the second independent variable data is sensor data and the sensor is one or more of a gyroscope, an accelerometer, or a touch capacitance sensor.

11. The non-transitory computer readable storage medium of claim 9, wherein the experimental platform device comprises a second sensor, wherein the first independent data corresponds to second user input comprising second manipulations of the second sensor of the experimental platform device by the user.

12. The non-transitory computer readable storage medium of claim 9, wherein the sensor of the first physical object comprises an actuator.

13. The non-transitory computer readable storage medium of claim 9, wherein a second physical object comprises a third sensor and is external to the first physical object and the experimental platform device, wherein the operations further comprise receiving third independent variable data from the second physical object, and wherein the modifying of the overlay animation is further based on the third independent variable data.

14. The non-transitory computer readable storage medium of claim 11, wherein the experimental platform device is a liquid stream table, the second sensor comprises a gyroscope sensor, the first independent variable data indicates an inclination of the liquid stream table, and the overlay animation comprises an erosion animation based on the inclination.

15. A system comprising:

an experimental platform device comprising a designated area for an experiment;

a first physical object comprising a sensor, wherein the first physical object is external to the experimental platform device; and a computing device coupled to a camera and a display device, wherein the experimental platform device and the first physical object are remote from the camera and the computing device, wherein the computing device is to:

receive, from the camera, a video of the experimental platform device;

cause the display device to display the video of the experimental platform device;

superimpose, in the video, an overlay animation on the designated area of the experimental platform device, the overlay animation corresponding to an environment of the experiment;

receive first independent variable data from the experimental platform device and second independent variable data from the first physical object, wherein the second independent variable data corresponds to user input comprising manipulations of the sensor of the first physical object by a user; and modify, in the video, the overlay animation superimposed on the designated area based on the first independent variable data and the second independent variable data.

16. The system of claim 15, wherein the computing device is a tablet and the camera and the display device are integral to the computing device.

17. The system of claim 15, wherein the second independent variable data is sensor data and the sensor is one or more of a gyroscope, an accelerometer, or a touch capacitance sensor.

18. The system of claim 15, wherein the experimental platform device comprises a second sensor, wherein the first independent data corresponds to second user input comprising second manipulations of the second sensor of the experimental platform device by the user.

19. The system of claim 15, wherein the sensor of the first physical object comprises an actuator.

20. The system of claim 15, wherein a second physical object comprises a third sensor and is external to the first physical object and the experimental platform device, wherein the computing device is further to receive third independent variable data from the second physical object, and wherein modifying the overlay animation is further based on the third independent variable data.

* * * * *